United States Patent [19]
Yamauchi

[11] Patent Number: 5,898,735
[45] Date of Patent: Apr. 27, 1999

[54] CIRCUIT AND METHOD FOR SIGNAL TRANSMISSION

[75] Inventor: Hiroyuki Yamauchi, Osaka, Japan

[73] Assignee: Matsushita Electric Industrial Co., Ltd., Osaka, Japan

[21] Appl. No.: 08/726,225

[22] Filed: Oct. 4, 1996

[30] Foreign Application Priority Data

Oct. 6, 1995 [JP] Japan .................................... 7-260367

[51] Int. Cl.⁶ .......................... H04L 27/04; H04L 27/12; H04L 27/20
[52] U.S. Cl. ............................................................ 375/295
[58] Field of Search .................................... 375/256, 257, 375/259, 295, 244, 288, 220, 377, 260; 327/65, 85, 407, 99; 326/86

[56] References Cited

U.S. PATENT DOCUMENTS

| | | | |
|---|---|---|---|
| 4,973,943 | 11/1990 | Arima | 340/506 |
| 5,111,080 | 5/1992 | Mizukami et al. | 307/475 |
| 5,264,744 | 11/1993 | Mizukami et al. | 307/475 |
| 5,444,740 | 8/1995 | Mizukami et al. | 375/286 |
| 5,454,001 | 9/1995 | Nagatani et al. | 371/68.2 |
| 5,515,387 | 5/1996 | Smith | 371/37.1 |
| 5,546,034 | 8/1996 | Han | 327/174 |
| 5,570,058 | 10/1996 | Maruyama | 327/404 |
| 5,627,796 | 5/1997 | Park et al. | 365/233.5 |
| 5,640,117 | 6/1997 | Tanoi | 327/231 |
| 5,655,078 | 8/1997 | Anderson et al. | 375/295 |
| 5,717,345 | 2/1998 | Yokomizo et al. | 326/80 |

FOREIGN PATENT DOCUMENTS 7-131308  5/1995  Japan .

*Primary Examiner*—Jason Chan
*Assistant Examiner*—Jean B Corrielus
*Attorney, Agent, or Firm*—McDermott, Will & Emery

[57] ABSTRACT

Two multiplexors select a first signal Ain and its inverted signal /Ain in the first half of a single cycle of a clock signal and Ain and /Ain, i.e., a differential signal pair, are differential-transmitted to two signal lines. On the other hand, the two multiplexors select a second signal Bin and its inverted signal /Bin in the second half and Bin and /Bin, i.e., a differential signal pair, are differential-transmitted to the two signal lines. Based on the transition probability of Ain and Bin or based on the mode information of a system, either Ain or Bin is selected and is differential-transmitted. As a result of such arrangement, when the transmission of one of Ain and Bin is not required, the other signal can continuously be differential-transmitted using an unoccupied signal line, which makes it possible to increase the rate of signal transmission without having to increase the number of signal lines.

41 Claims, 37 Drawing Sheets

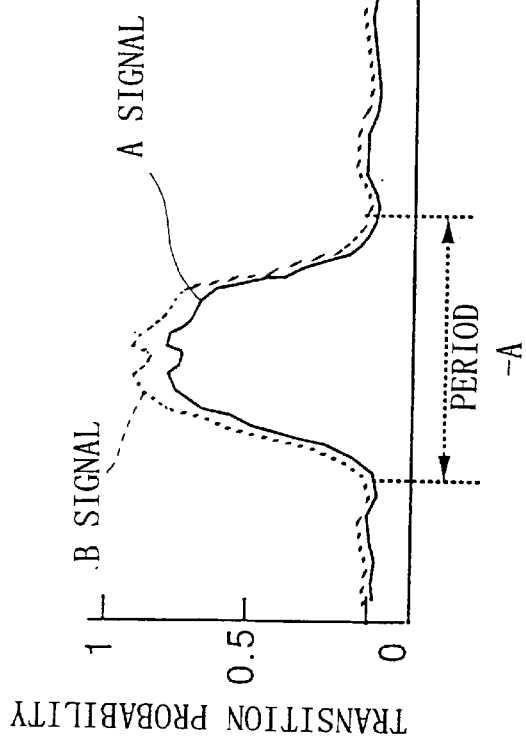
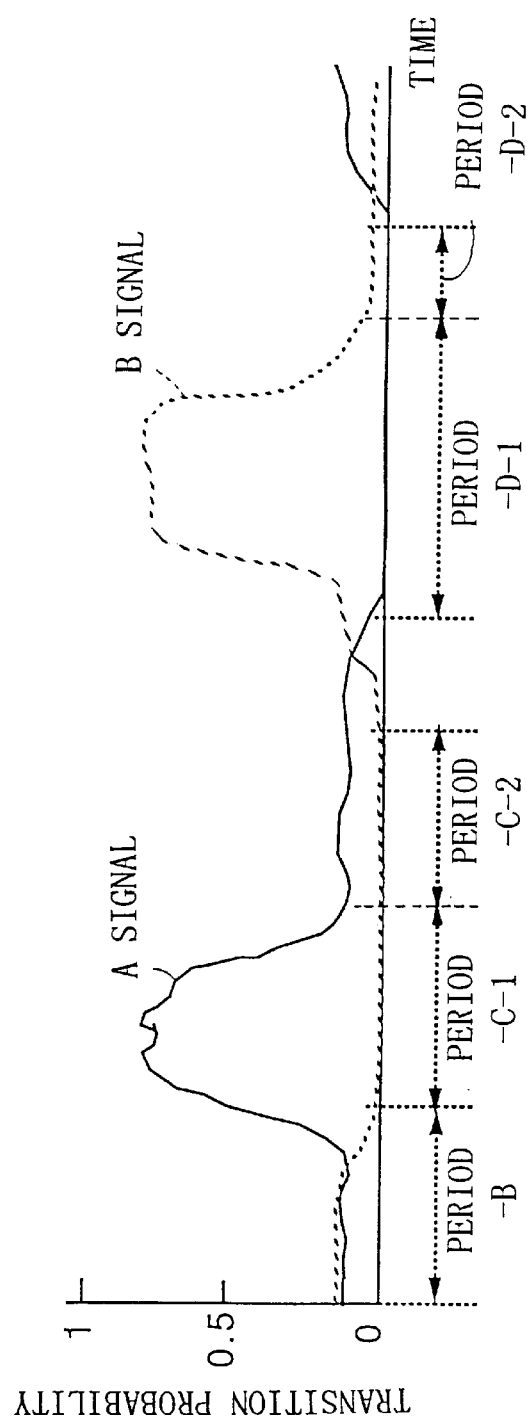
FIG. 9(a)
FIG. 9(b)

FIG. 10

|  | e | f | g |
|---|---|---|---|
| Case-1 (PERIOD-A) | h | i | 1 |
| Case-2 (PERIOD-B) | j (killed) | k | 0 |
| Case-3 (PERIOD-C-2) | j (killed) | k | 0 |
| Case-4 (PERIOD-D-2) | j (killed) | k | 0 |
| Case-5 (PERIOD-C-1) | h | i | 1 |
| Case-6 (PERIOD-D-1) | h | i | 1 |

FIG. 22

| A-GROUP | B-GROUP |
|---|---|
| LUMINANCE | CHROMINANCE |
| CHARACTER WINDOW | ANIMATED IMAGE WINDOW |
| EVEN-NUMBERED FIELD | ODD-NUMBERED FIELD |
| ⋮ | ⋮ |

FIG. 32

|        | a     | b     | c     | d     | z0 | z1 | g0 | g1 |
|--------|-------|-------|-------|-------|----|----|----|----|
| Case-O | 1     | 1     | 0     | 0     | 0  | 0  | j  | j  |
| Case-P | 1     | 1     | 0     | 0     | 0  | 1  | n  | n  |
| Case-Q | 1 (0) | 0 (1) | 1 (0) | 0 (1) | 1  | 0  | j  | m  |
| Case-R | 1 (0) | 0 (1) | 1 (0) | 0 (1) | 1  | 1  | n  | u  |

CIRCUIT AND METHOD FOR SIGNAL TRANSMISSION

BACKGROUND OF THE INVENTION

1. Technical Field

The present invention relates to circuits and methods for signal transmission. The present invention pertains, more specifically, to improvements in the transmission of signal in a memory circuit or microprocessor which transmits in parallel a great number of signals in synchronisation with a predetermined clock signal, in a single semiconductor chip or between two semiconductor chips.

2. Technical Background

Conventionally, microprocessors that perform parallel signal processing or memory circuits, such as image memories, synchronous dynamic random access memories (SDRAMs), static random access memories (SRAMs), employ the following basic configuration for the drive of signal lines, in other words for the transmission of signals.

This basic configuration is illustrated with reference to FIG. 36. 100 and 101 are signal transmission lines each of which is formed by a single line. 102 and 103 are drivers, formed by inverters, for transmitting signals to the signal lines 100 and 101. 104 and 105 are receivers, formed by inverters, for receiving signals from the signal lines 100 and 101.

The operation of the configuration of FIG. 36 is illustrated by making reference to FIG. 37. For the case of the transmission of parallel signals in synchronization with a clock signal MCLK, an input signal Ain and an input signal Bin are taken in on the rising or falling edge of the clock signal MCLK (Ain and Bin are taken in on the rising edge in FIG. 37) and, at this timing, the drivers 102 and 103 are activated at the same time so as to drive the signal lines 100 and 101, whereby the input signals Ain and Bin are transmitted to the signal lines 100 and 101, respectively. On the other hand, the signals of the signal lines 100 and 101 are fed into the inputs of the receivers 104 and 105 on the rising or falling edge of the clock signal MCLK (the signals are fed to the inputs on the rising edge in FIG. 37) and, at this timing, the receivers 104 and 105 are activated at the same time so as to detect the signals of the signal lines, whereby a detection signal Aout and a detection signal Bout are provided from the receivers 104 and 105.

The conventional configuration, however, has some problems. For example, each of the signal transmission lines 100 and 101 is formed of a single line. As a result, signals of the signal line each indicate a potential difference between the post-variation potential of a signal line and the reference threshold voltage for signal identification of a corresponding receiver. For this reason, when taking into account power supply noise, it becomes necessary to set a greater potential amplitude for each signal line. As a result, greater electric power is consumed when transmitting signals. Additionally, there are effects of wiring delay determined by a multiplication product of the wiring capacitance and the wiring resistance of each signal line. The conventional configuration, therefore, suffers from the problem that a large amount of power is consumed, even in low-speed operations.

To cope with such a problem accompanied with the conventional configuration, a configuration is proposed in which signal lines other than the signal lines 100 and 101 are provided in the same number as each signal line 100 and 101 and, at the time of the transmission of signals through each signal line, the signals are differential-transmitted using a signal line and its corresponding signal line.

The potential amplitude of signal lines can be reduced by means of the foregoing configuration, which makes it possible to achieve power saving. In spite of such an advantage, the number of signal lines increases. If the number of parallel bits increases from 64 up to 128 in image memories or the like, this increases both the chip area and the product cost. For this reason, it is difficult for such a configuration to achieve small and low-cost circuits.

SUMMARY OF THE INVENTION

Bearing in mind the above-described problems with the prior art techniques, the present invention was made. Accordingly, it is an object of the present invention to provide an improved signal transmission technique. More specifically, wire sharing is employed even in signal transmission circuits with great numbers of signal transmission lines, whereby, without increasing the number of signal transmission lines, signal differential-transmission can be executed while accomplishing area saving. Additionally, at the time of such signal differential-transmission, if the contents of a signal that is differential-transmitted do not change, then another signal whose contents undergo a change is selected and is differential-transmitted. In other words, the present invention employs a configuration capable of choosing signals to be conveyed. Power saving by means of small amplitude transmission and improvements in the signal transmission rate can be accomplished by small and low-cost signal transmission circuits and by signal transmission methods in accordance with the present invention.

It is another object of the present invention to provide improved signal transmission circuits and methods capable of achieving high signal transmission rates by using a configuration capable of transmitting, when the contents of a signal that is transmitted through one signal transmission line change, such a signal by making use of another vacant signal transmission line.

The present invention achieves the first object with the following arrangement. In accordance with the present invention, it is basically arranged such that, in two signal transmission lines, two signals corresponding to the two signal transmission lines are not transmitted at the same time. More specifically, one of the two signals is differential-transmitted using the two signal transmission lines in the first half of one cycle of the clock signal and the other signal is differential-transmitted using the two signal transmission lines in the second half. In such a case, the two signals are transmitted by turns or only one of the two signals is designated and transmitted continuously in time.

The present invention achieves the second object with the following arrangement. In the present invention, for the case of the single-line transmission of signals, if the contents of a first signal subjected to transmission do not change, then a second signal whose contents have changed is transmitted using a signal transmission line corresponding to the first signal (a vacant signal transmission line).

The present invention provides a signal transmission circuit comprising a unit circuit, the unit circuit comprising:

(a) a first and second signal lines through which a first and second signals are conveyed;

(b) a signal generation circuit for generating a mismatch signal which forms a differential signal pair with at least one of the first and second signals and which does not match in time with the one of the first and second signals; and (c) control means which receives the mismatch signal and the one of the first and second signals and which transmits the received signals to the first and second signal lines as the differential signal pair.

The present invention provides a signal transmission circuit comprising a plurality of the aforesaid unit circuits.

In the foregoing signal transmission circuit of the present invention, the signal generation circuit includes:

(a) a first signal generation circuit for generating a first mismatch signal which forms a first differential signal pair with the first signal and which does not match in time with the first signal;

(b) a second signal generation circuit for generating a second mismatch signal which forms a second differential signal pair with the second signal and which does not match in time with the second signal; and the control means includes:

(c) selection means for receiving the first and second signals and the first and second mismatch signals and for selecting between the first differential signal pair and the second differential signal pair for forwarding to the first and second signal lines;

(d) designation means for determining which of the first and second differential signal pairs is selected by the selection means.

The present invention provides a signal transmission method of transmitting a first and second signals to be conveyed by means of a first and second signal lines, the signal transmission method comprising:

(a) a first step of receiving the first and second signals;

(b) a second step of generating a signal which forms a differential signal pair with at least one of the first and second signals and which does not match in time with the one of the first and second signals; and (c) a third step of transmitting the mismatch signal and the one of the first and second signals to the first and second signal lines as the differential signal pair.

In the aforesaid signal transmission method, the second step includes generating a first and second mismatch signals that do not match in time with the first and second signals, respectively, and the third step includes:

(a) detecting transition probabilities with time for the first and second signals;

(b) selecting between a first differential signal pair made up of the first signal and the first mismatch signal and a second differential signal pair made up of the second signal and the second mismatch signal, according to the detected transition probabilities; and (c) sending the selected differential signal pair to the first and second signal lines.

In the signal transmission method, the second step includes generating a first and second mismatch signals that do not match in time with the first and second signals, respectively, and the third step includes:

(a) detecting mode information including system usage-condition information;

(b) selecting between a first differential signal pair made up of the first signal and the first mismatch signal and a second differential signal pair made up of the second signal and the second mismatch signal, according to the detected mode information; and (c) sending the selected differential signal pair to the first and second signal lines.

The present invention provides a signal transmission circuit for transmitting a first and second signals to be conveyed by means of a first and second signal lines, the signal transmission circuit comprising a unit circuit;

the unit circuit comprising:

(a) first switch means for inputting first signals and for outputting the first signals to a first signal line;

(b) second switch means for inputting second signals and for outputting the second signals to a second signal line (c) third switch means for inputting first signals and for outputting the first signals to the second signal line;

(d) fourth switch means for inputting second signals and for outputting the second signals to the first signal line;

(e) first control means for controlling, when the second switch means sends no second signals to the second signal line at the time when the first switch means sends a first signal to the first signal line, the third switch means to send the next first signal to the second signal line; and (f) second control means for controlling, when the first switch means sends no first signals to the first signal line at the time when the second switch means sends a second signal to the second signal line, the fourth switch means to send the next second signal to the first signal line.

The present invention provides a signal transmission method of transmitting a first and second signals to be conveyed by means of a first and second signal lines, the signal transmission method comprising the steps of:

(a) receiving the first and second signals;

(b) sending the first signal to the first signal line;

(c) detecting the transition probability of the input second signal with respect to time; and (d) when the detected transition probability is low, sending to the second signal line a first signal following in time the previously sent first signal.

The present invention provides a signal transmission method of transmitting a first and second signals to be conveyed by means of a first and second signal lines, the signal transmission method comprising the steps of:

(a) receiving the first and second signals;

(b) sending the first signal to the first signal line;

(c) detecting mode information including system usage-condition information; and (d) when the detected mode information indicates no requirements that the input second signal is transmitted, sending to the second signal line a first signal following in time the previously sent first signal.

The present invention provides the following advantages. Basically, each of the first and second signals is transmitted by means of single-line transmission and each of the first and second signals is differential-transmitted in the form of a differential signal pair using two signal transmission lines, in the present invention. Additionally, one of the first and second signals is differential-transmitted using both of the signal transmission lines for the first and second signals, thereby achieving differential signal transmission with a less number of signal transmission lines in relation to a commonly-used differential signal transmission technique in which differential signal transmission is achieved by providing signal transmission lines for respective signals. As a result of such arrangement, the area of image memory and the area of signal transmission system between microprocessors for performing parallel signal processing can be reduced. Furthermore, the choice of which one of the first and second signals to be differential-transmitted is based on their transition probability and mode information, in other words when the contents (information) of the second signal makes no change (the transition probability of the second signal is low), the first signal, whose contents makes a change, is differential-transmitted continuously in time thereby increasing the rate of signal transmission.

In the present invention, for the case of single-line signal transmission in which a first and second signals are transmitted through the first and second signal transmission lines respectively, if the contents of the next first signal change and the contents of the next second signal do not change, the next first signal is transmitted through the second signal transmission line in the state of vacancy. Accordingly, even for the case of single-line signal transmission, the signal transmission rate can be improved with no increase in the number of signal transmission lines.

The aforesaid objects and other features of the present invention will be better understood from the following description when considered with the accompanying drawings.

BRIEF DESCRIPTION OF THE DRAWINGS

Preferred embodiments of this invention are described with reference to the drawings in which:

FIG. 9, comprised of FIGS. 9(a) and 9(b), graphically shows the transition probability of two different signals that are conveyed, in which FIG. 9(a) shows an example case in which the transition probability of one of the two signals and the transition probability of the other signal are approximately the same and FIG. 9(b) shows another example case in which the transition probabilities differ from each other;

FIG. 10 is a truth table for the control circuit of the signal transmission circuit in accordance with the first embodiment;

FIG. 22 shows the signal groups A and B in detail;

FIG. 32 is a truth table for the control circuit of the signal transmission circuit of the third embodiment;

DETAILED DESCRIPTION OF THE INVENTION

Preferred embodiments of the present invention are described below with reference to the accompanying drawings.

FIRST EMBODIMENT

Figure 1:
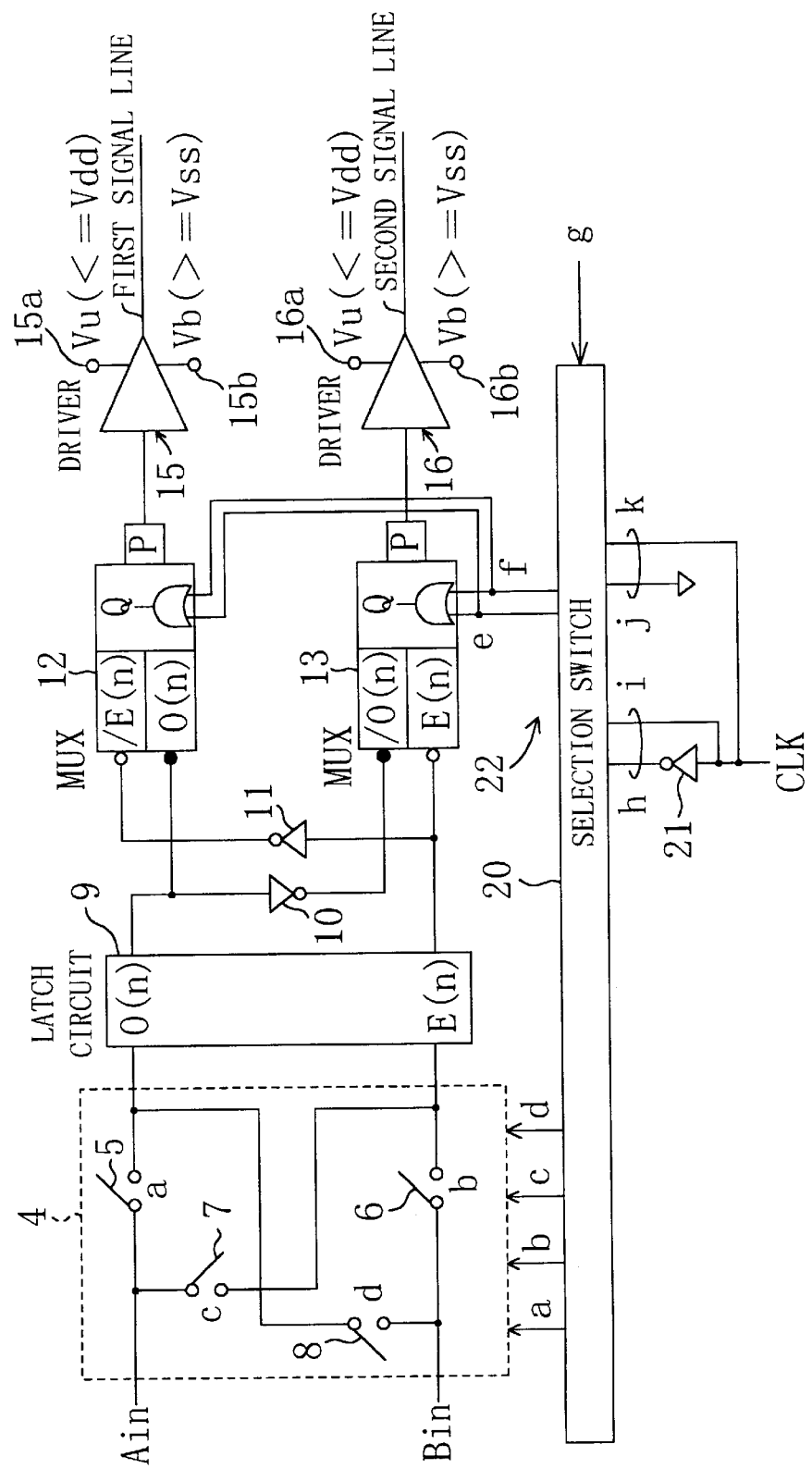
FIG. 1 depicts the configuration of a signal transmission circuit in accordance with a first embodiment of the present invention.
Figure 4:
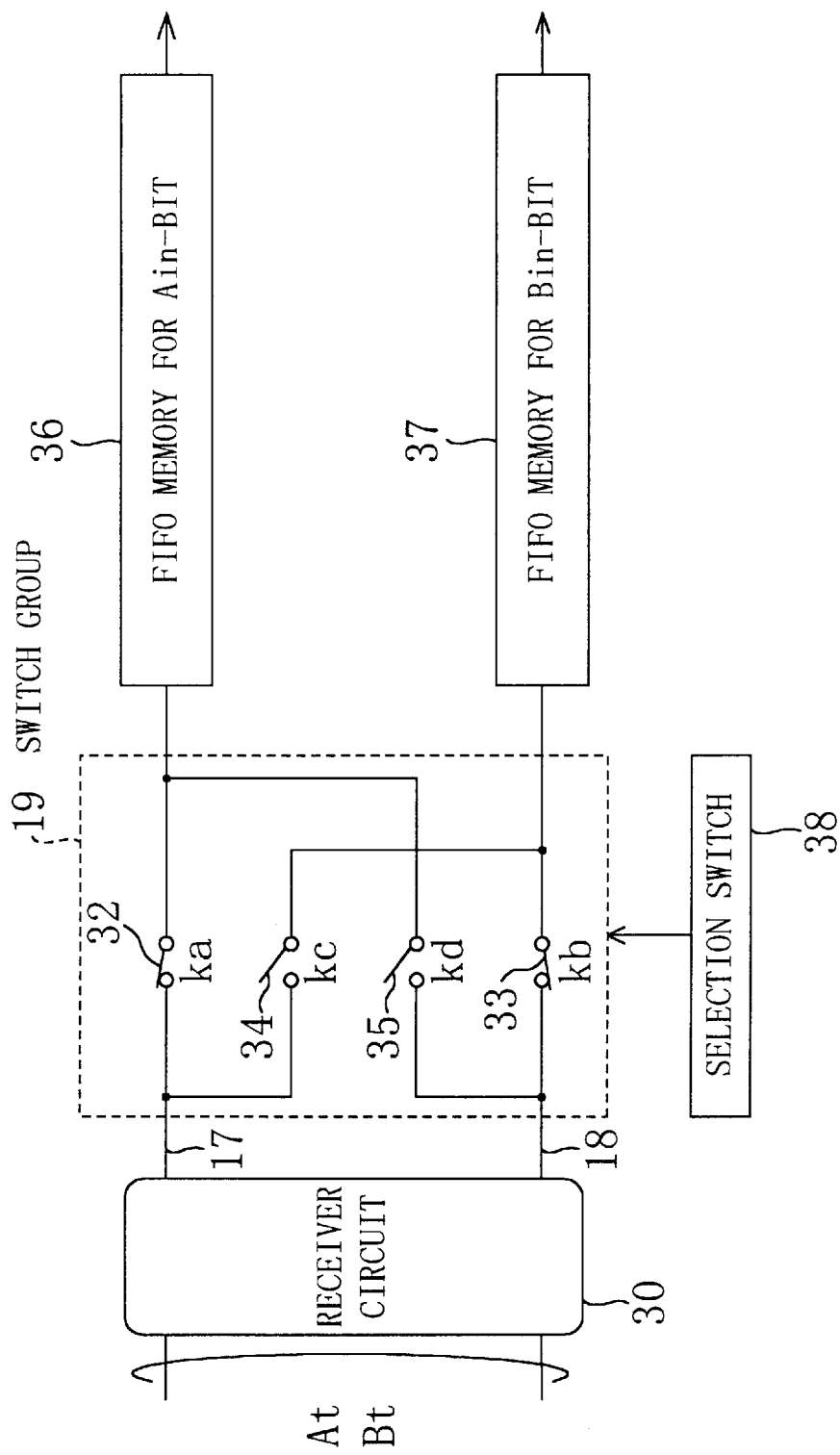
FIG. 4 depicts the configuration of a signal receiving-area circuit of the first embodiment.

A signal transmission circuit of a first embodiment of the present invention is illustrated by making reference to FIGS. 1 and 4. More specifically, FIG. 1 shows a signal transmitting-area circuit and FIG. 4 shows a signal receiving-area circuit.

Ain is a first signal to be conveyed. Bin is a second signal to be conveyed. 1 is a first signal line. 2 is a second signal line. The first and second signal lines 1 and 2 form a pair for signal differential transmission.

4 is a switch group of four switch circuits 5, 6, 7 and 8. 9 is a latch circuit with an input terminal O(n) and an input terminal E(n). When the switch circuit 5 is closed, the first signal Ain is applied to the terminal O(n). When the switch circuit 6 is closed, the second signal Bin is applied to the terminal E(n). When the switch circuit 7 is closed, the first signal Ain is applied to the terminal E(n). When the switch circuit 8 is closed, the second signal Bin is applied to the terminal O(n). The latch circuit 9 may be placed at a stage before the switch group 4.

10 is an inverter (first signal generation circuit). 11 is an inverter (second signal generation circuit). The inverter 10 inverts a latch signal from the terminal O(n) of the latch circuit 9 and generates a first mismatch signal that does not correspond in time to the first signal Ain. On the other hand, the inverter 11 inverts a latch signal from the terminal E(n) of the latch circuit 9 and generates a second mismatch signal that does not correspond in time to the second signal Bin.

12 and 13 are multiplexors (MUXs) (selection means). The MUX 12 has a terminal O(n) which receives a latch signal of the terminal O(n) of the latch circuit 9 and a terminal /E(n) which receives an inverted signal from the inverter 11. The MUX 12 selects between the latch signal at the terminal O(n) and the reversed signal at the terminal /E(n) according to control signals f and e from a selection switch 20 which is described later, thereafter providing the latch signal or the inverted signal, whichever is selected, at its output terminal P. On the other hand, the MUX 13 has a terminal E(n) which receives a latch signal from the terminal E(n) of the latch circuit 9 and a terminal /O(n) which receives an inverted signal from the inverter 10. The MUX 13 selects between the latch signal at the terminal E(n) and the inverted signal at the terminal /O(n) according to the control signals f and e, thereafter providing the latch signal or the inverted signal, whichever is selected, at its output terminal P.

15 is a differential driver which transmits to the first signal line 1 a signal received from the output terminal P of the MUX 12. 16 is another differential driver which transmits to the second signal line 2 a signal received from the output terminal P of the MUX 13. Each differential driver 15 and 16 has a high-voltage terminal (15a, 16a) having a high voltage Vu below a power supply voltage Vdd and a low-voltage terminal (15b, 16b) having a low voltage Vb (Vb<Vu) above a ground voltage Vss. When the differential drivers 15 and 16 receive signals of high potential level, the drivers 15 and 16 apply Vu at their high-voltage terminals 15a and 16a to the first signal line 1 and to the second signal line 2, respectively. On the other hand, when the driver 15 and 16 receive signals of low potential level, the driver 15 and 16 apply Vb at their low-voltage terminal 15b and 16b to the first and second signal lines 1 and 2, respectively. Although the potential difference between the high voltage Vu and the low voltage Vb, that is, (Vu−Vb), depends upon the receiving sensitivity of a receiver circuit 30 which is described later, such a difference in potential is required to be above approximately 5 mV but below Vcc (power supply voltage).

20 is a selection switch (designation/frequency designation means). This selection switch 20 receives a clock signal CLK and its inverted signal (/CLK) generated by an inverter 21, as a first signal pair formed of a signal i and a signal h. In addition, the selection switch 20 further receives CLOCK SIGNAL CLK and a signal of ground potential as a second signal pair formed of a signal k and a signal j. Other than the first and second signal pairs, the selection switch 20 further receives a frequency designation signal g which controls the number of times each MUX 12 and 13 needs to select a signal within one cycle of CLOCK SIGNAL CLK. When the circuit control signal g has a value of "1", the selection switch 20 selects the first signal pair (the signals i and h) as the control signals f and e and sends the first signal pair to the MUX 12 and to the MUX 13. On the other hand, when the circuit control signal g has a value of "0", the selection switch 20 selects the second signal pair (the signals k and j) as the control signals f and e and sends the second signal pair to the MUX 12 and to the MUX 13.

Figure 2:
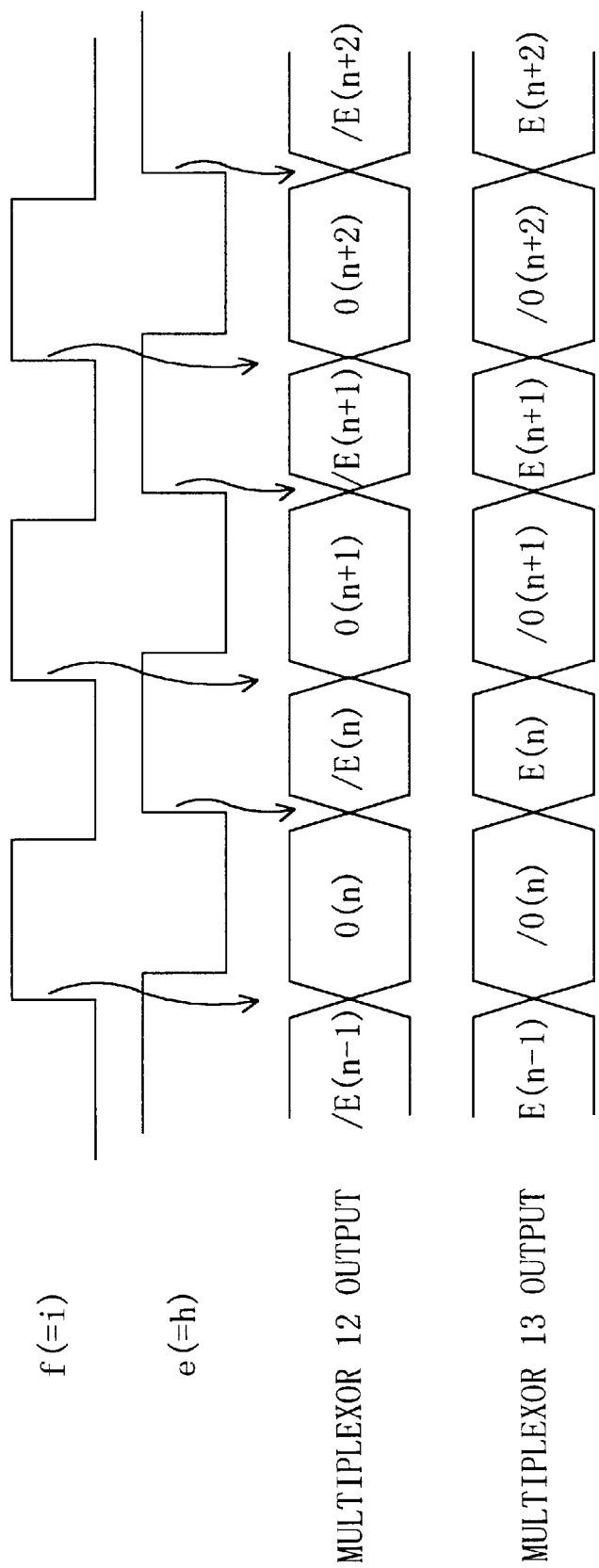
FIG. 2 shows signal selection by multiplexors of the signal transmission circuit.
Figure 3:
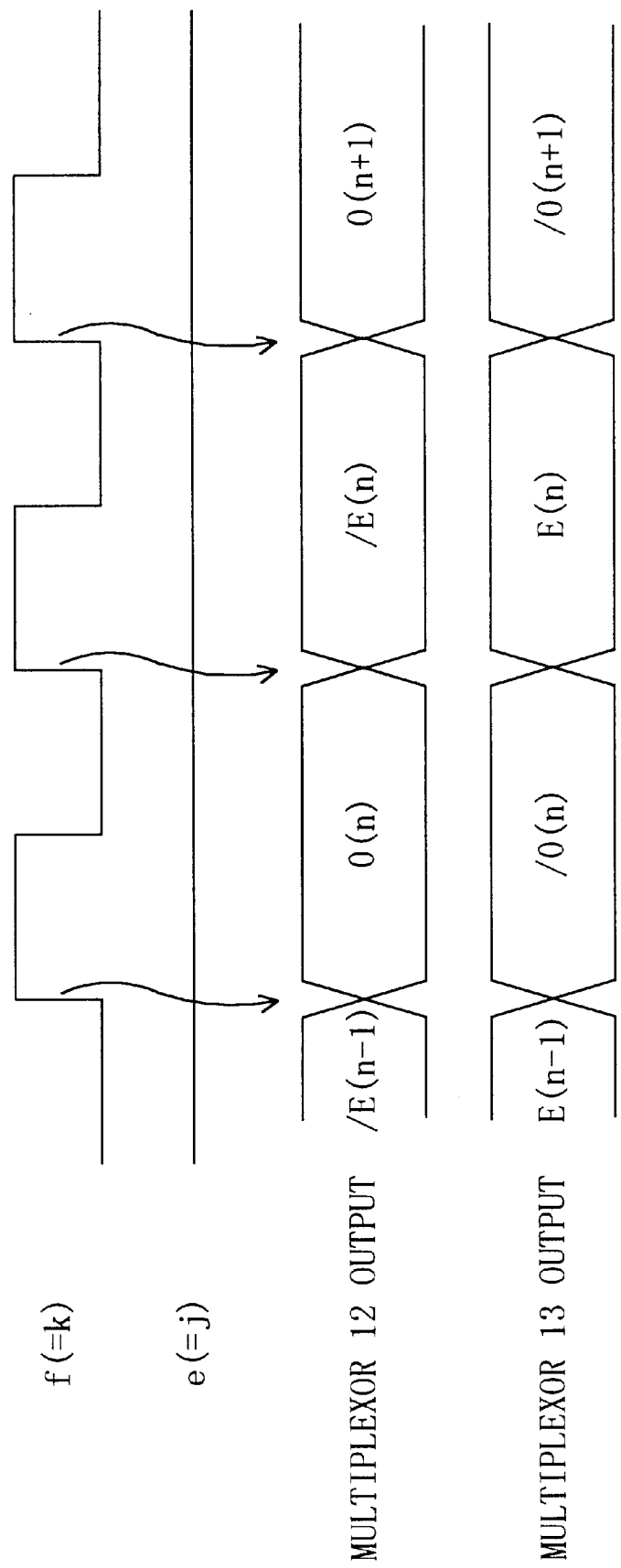
FIG. 3 shows one other signal selection by multiplexors of the signal transmission circuit.

Each of the MUXs 12 and 13 receives from the selection switch 20 the control signals f and e so that its two input terminals are cyclically selected either on the rising edge of the control signal f or on the rising edge of the control signal e. More specifically, when the control signals f and e are the first signal pair (the signals i and h), as shown in FIG. 2, on the rising edge of the signal i, the MUX 12 sequentially provides a signal O(n), a signal O(n+1) and so on and the MUX 13 sequentially provides a signal /O(n) and a signal /O(n+1) and so on, while, on the rising edge of the signal h, the MUX 12 sequentially provides a signal /E(n), a signal /E(n+1) and so on and the MUX 13 sequentially provides a signal E(n), a signal E(n+1) and so on. On the other hand, if the control signals f and e are the second signal pair (the signals k and j), as shown in FIG. 3, the MUX 12 and the MUX 13 perform output signal switching in synchronization only with the rising edge of the signal k. As a result, if the second signal pair (the signals k and j) becomes the control signals f and e (FIG. 3), output signal switching is performed at a cycle twice the cycle in the case of the first signal pair (the signals i and h) becoming the control signals f and e.

The MUXs 12, 13 and the selection switch 20 together constitute a control means 22. This control means 22 selects between a first differential signal pair of complementary signals and a second differential signal pair of complementary signals. The first differential signal is composed of the first signal Ain from the terminal O(n) of the MUX 12 and the inverted signal /Ain from the terminal /O(n) of the MUX 13, and the second differential signal is composed of the second signal Bin from the terminal E(n) of the MUX 13 and the inverted signal /Bin from the terminal /E(n) of the MUX 12. Thereafter, the control means 22 controls the transmission of the selected differential signal pair from the differential drivers 15 and 16 onto the signal lines 1 and 2.

The selection switch 20 provides signals a, b, c and d to the switch circuits 5, 6, 7 and 8 and controls the opening/closing of these circuits 5, 6, 7 and 8 on the basis of the aforesaid input signals, examples of which are shown in FIGS. 11–16 and will be explained in detail later.

Figure 5:
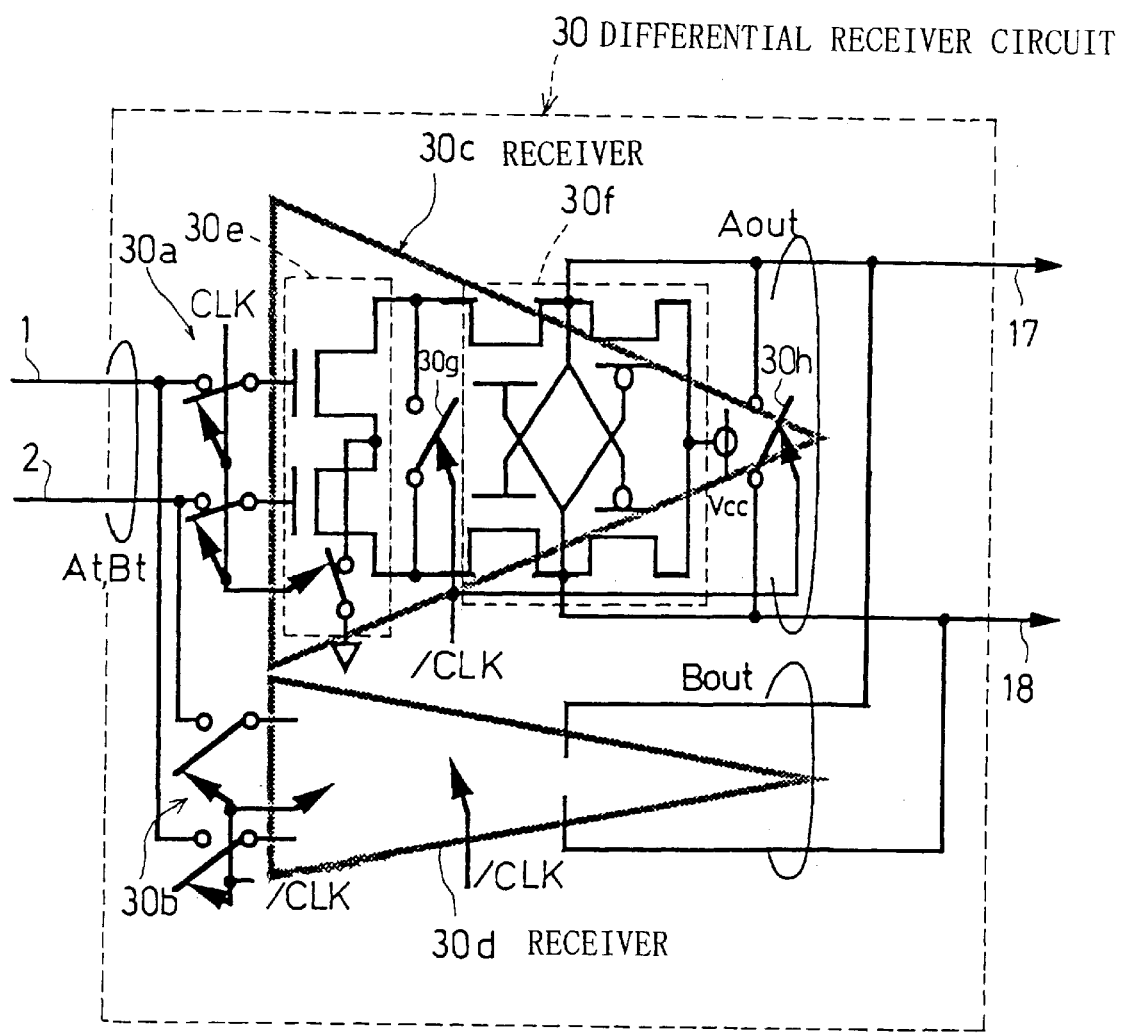
FIG. 5 depicts the specific configuration of a differential receiver circuit of the signal receiving-area circuit.
Figure 6:
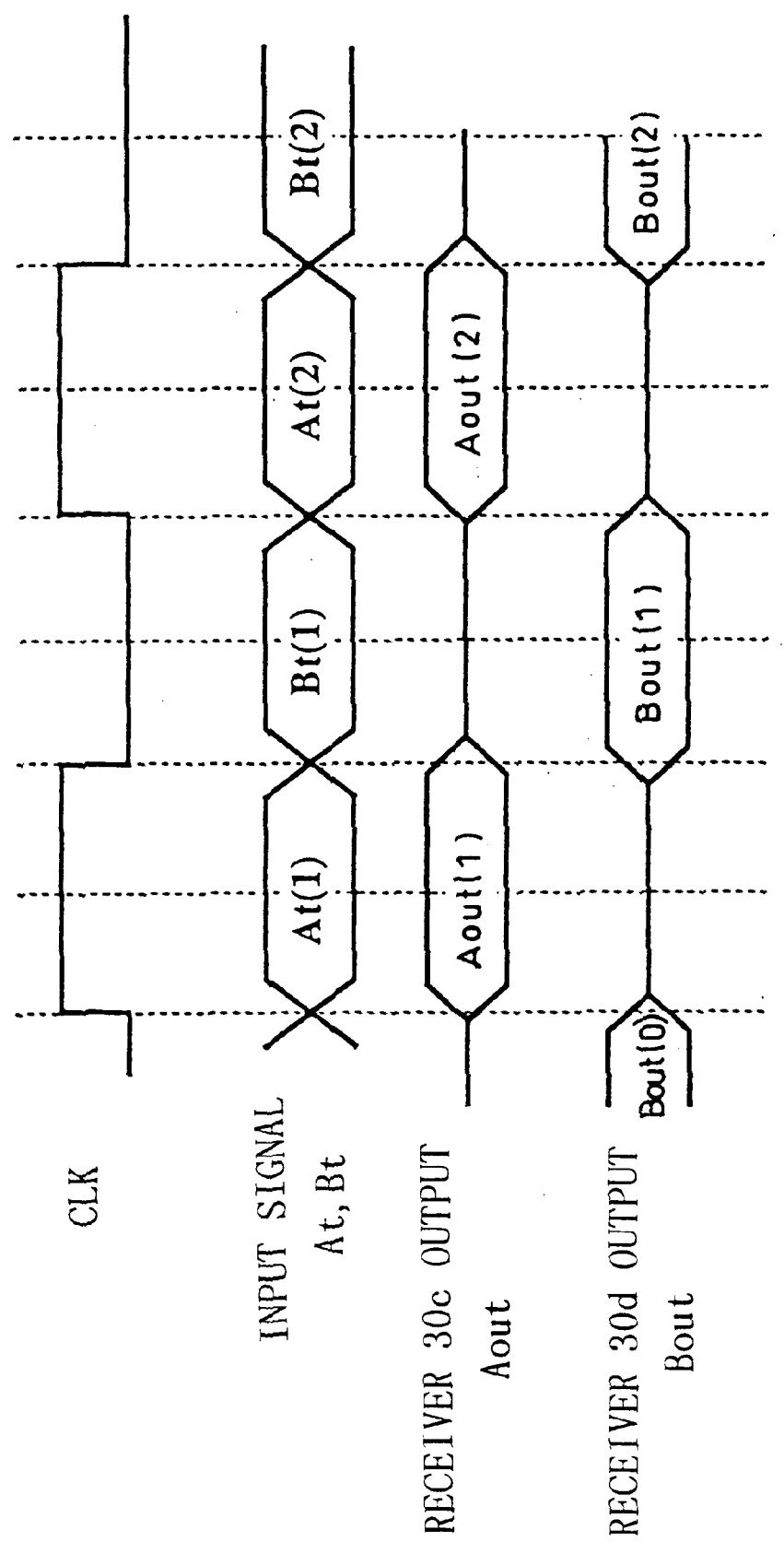
FIG. 6 is a diagram useful in understanding the operation of the differential receiver circuit.

Referring to FIG. 4, At and Bt are differential signal pairs that are sequentially applied to the first and second signal lines 1 and 2. 30 is a differential receiver circuit for sequentially receiving the differential signal pairs At and Bt. 17 and 18 are output signal lines to which the output of the differential receiver circuit 30 (i.e., the differential signal pairs) is sent. Referring to FIG. 5, there is shown the internal configuration of the differential receiver circuit 30. The differential receiver circuit 30 has two switch circuits 30a and 30b connected to the first signal line 1 and to the second signal line 2, respectively. The differential receiver circuit 30 further has receivers 30c and 30d of the differential input/differential output type connected to the switch circuit 30a and to the switch circuit 30b, respectively. The switch circuit 30a is closed when CLOCK SIGNAL CLK is HIGH, while the switch circuit 30b is closed when the inverted signal /CLK is LOW, in other words when CLOCK SIGNAL CLK is LOW. Accordingly, both the receiver 30c and the receiver 30d operate in interleaved relationship (see FIG. 6). The receivers 30c and 30d are identical in structure with each other and therefore only the internal structure of the receiver 30c is described in detail. The receiver 30c is fed Vcc (power supply voltage) and is grounded which is indicated by a reversed triangle symbol in the figure. The receiver 30c has a voltage/current conversion circuit 30e and a flip-flop circuit 30f and level-converts a potential difference between the first signal line 1 and the second signal line 2 into a potential difference between Vcc (power supply voltage) and Vss (ground voltage). 30g and 30h are switches of the receiver 30c. These switches 30g and 30h are closed when SIGNAL/CLK is HIGH and precharge the differential output lines 17 and 18 to the same electric potential when receiving no signals from the signal lines 1 and 2.

Referring to FIG. 4, 19 is an output-area switch group of four switch circuits 32, 33, 34 and 35 (receiving-area selection means). 36 is an FIFO memory (first memory means) dedicated to storing only the signal Ain. 37 is an FIFO memory (second memory means) dedicated to storing only the signal Bin. The opening/closing of each switch circuit 32–35 of the switch group 19 is controlled by a selection switch circuit 38. This opening/closing control is now outlined. For example, when the differential signal pair At, composed of Ain and /Ain, is given, one of the signal lines 17 and 18 that receives Ain is connected to the FIFO memory 36. On the other hand, when the differential signal pair Bt, composed of Bin and /Bin, is given, one of the signal lines 17 and 18 that receives Bin is connected to the FIFO memory 37. Examples of the opening/closing control are shown in FIGS. 11 to 16. These examples are described later. Each of the FIFO memories 36 and 37 maintains current signal output unless they are fed signals.

Figure 7:
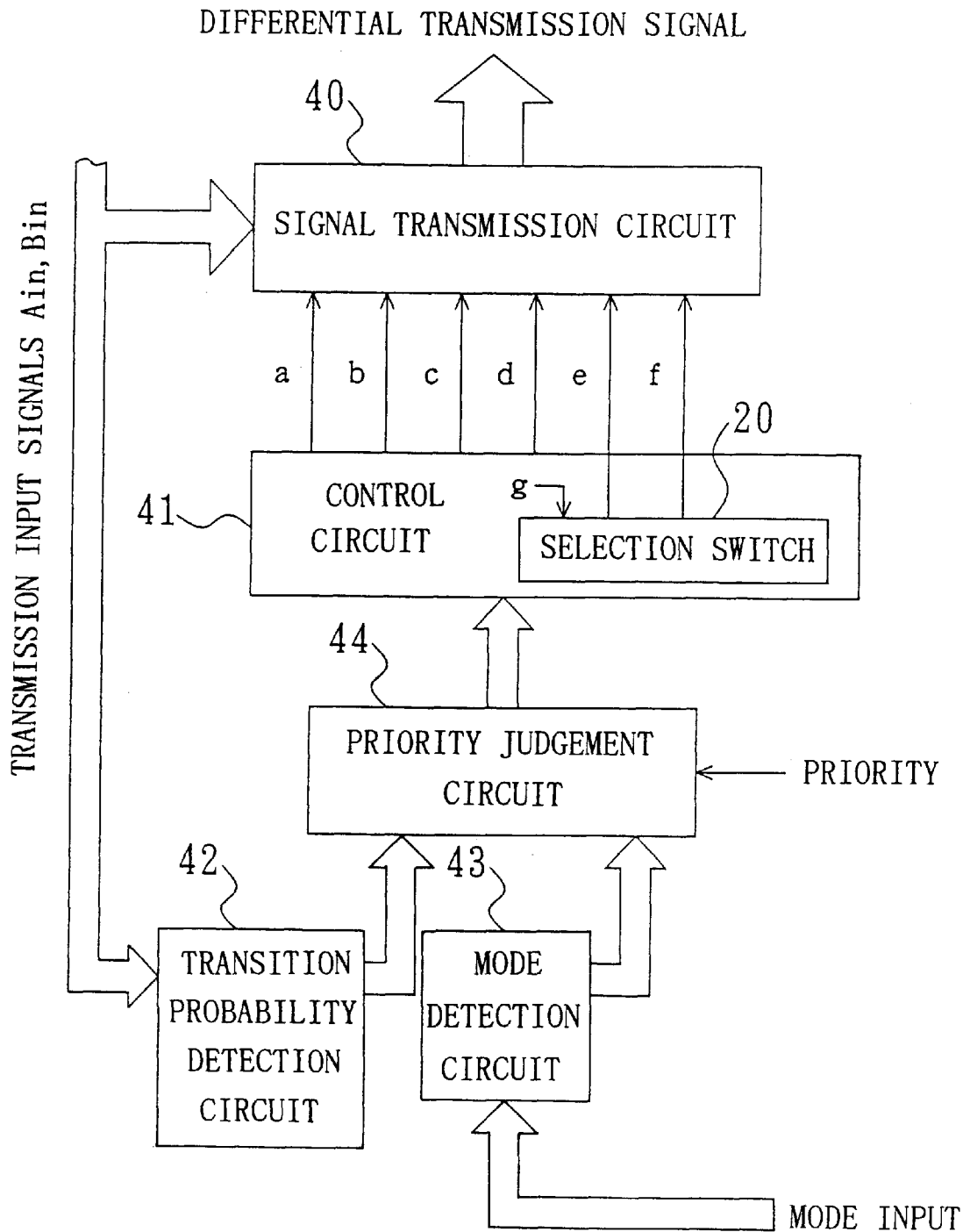
FIG. 7 depicts the configuration of a control circuit which controls the signal transmission circuit of the first embodiment.

Referring now to FIG. 7, there is shown the entire configuration of a control circuit that controls the circuits shown in FIGS. 1 and 4 with the exclusion of the selection circuit 20.

40 is a signal transmission circuit (FIG. 7) which is comprised of the FIG. 1 circuit without the selection switch 20. 41 is a control circuit including the selection switch 20. The control circuit 41 outputs the signals a–d to the switch circuits 5–8 and the control signals f and e to the MUXs 12 and 13.

42 is a transition probability detection circuit (TPDC) (transition probability detection means). 43 is a mode detection circuit (mode detection means). 44 is a priority judgement circuit (selection means).

Figure 8:
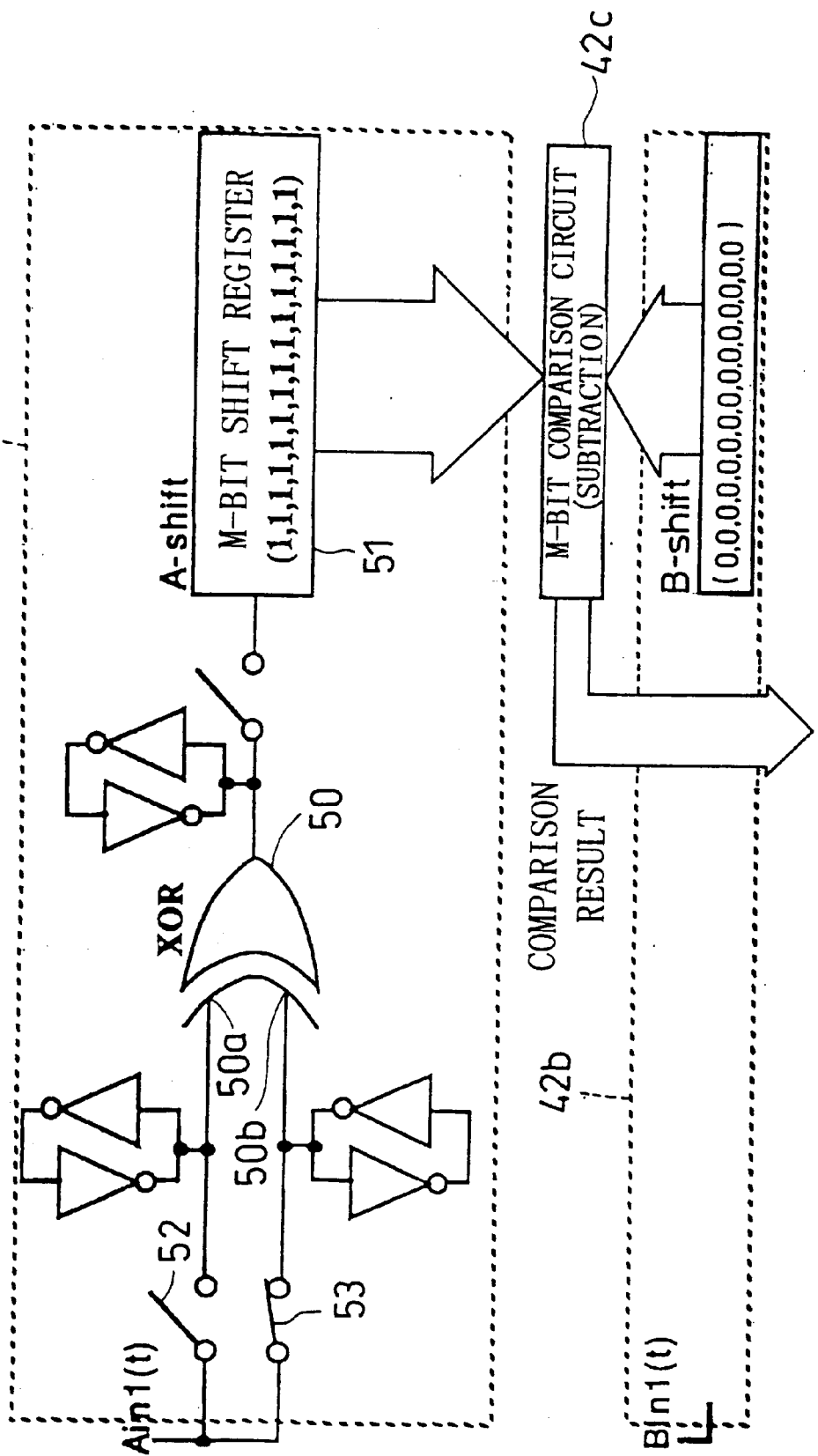
FIG. 8 depicts the internal configuration of a transition probability detection circuit of the signal transmission circuit of the first embodiment.

The TPDC 42 comprises a first detection circuit 42a, a second detection circuit 42b and an m-bit comparison circuit (judgement/comparison circuit) 42c (FIG. 8). The first and second detection circuits 42a and 42b are identical in construction with each other and therefore the description is made to the first detection circuit 42a only.

The first detection circuit 42a has switches 52 and 53 for receiving the first signal Ain to be conveyed. These two switches 52 and 53 are closed by turns. The closing operation of the switch circuit 52 causes a first signal Ain to be applied to a first input terminal 50a of a 2-input exclusive OR (XOR) circuit (first XOR circuit) 50. Thereafter, by the closing operation of the switch circuit 53, the next first signal Ain is applied to a second input terminal 50b of the XOR circuit 50. The XOR circuit 50 provides an output of "1" when the previous value and the current value of Ain are different. On the other hand, the XOR circuit 50 provides an output of "0" when both the previous and current values of Ain are identical. The output of the XOR circuit 50 is supplied to an m-bit shift register 51. Accordingly, when the transition probability (TP) of the first signal Ain is high, it is most likely that each bit stored in the m-bit shift register 51 has a value of "1".

The m-bit comparison circuit 42c performs subtraction operations of m-bit information stored in the m-bit shift registers 51 of the detection circuits 42a and 42b for comparison, for every given cycle. It is supposed here that the output of the m-bit shift register 51 of the first detection circuit 42a is A and the output of the m-bit shift register 51 of the second detection circuit 42b is B. Then, if A>>B, this case is judged to be a period C-1 during which the TP (transition probability) of the first signal Ain is higher than the TP of the second signal Bin by more than a predetermined value (FIG. 9(b)). If A>B, this case is judged to be a period C-2 during which the TP of the first signal Ain is higher than the TP of the second signal Bin, but it is below the predetermined value. If A<<B, this case is judged to be a period D-1 during which the TP of the second signal Bin is higher than the TP of the first signal Ain by more than the predetermined value. If A<B, this case is judged to be a period D-2 during which the TP of the second signal Bin is higher than the TP of the first signal Ain, but it is below the predetermined value. Finally, if A=B, this case is judged to be a period A during which the TP of the first signal Ain is as high as the TP of the second signal Bin (FIG. 9(a)).

The comparison cycle of the m-bit comparison circuit 42c is not limited to the period in which m transition detection results are stored. The comparison cycle may be longer than the period. Additionally, the comparison period may be changed in time according to the mode information.

The mode detection circuit 43, shown in FIG. 7, receives mode information including system usage-condition information, to detect a current mode. The reason for the provision of the mode detection circuit 43 is to transmit signals that have a high TP at a high density and at a high speed (when the TP of signals to be conveyed is predictable, there is no need of actually detecting and monitoring the TP of such signals by means of the TPDC 42).

The aforesaid input mode information may be information about the type of software currently used or information about the number of windows opened in a monitor screen. In other words, the usage situation of software dealing with image information and the usage condition of software dealing with only character information (word processing software) may be entered as mode information. At the time when only character information is processed, image processors do not operate so that a plurality of interconnection lines assigned to the image processors enter the unused state. Accordingly, it is possible to make utilization of such vacant interconnection lines for the transmission of character information. As the number of open windows increases, the signal TP increases and this information can be fed as mode information.

With reference to FIG. 7, the priority judgement circuit 44 receives a signal indicative of a pre-set priority and, based on the priority, selects between the output of the TPDC 42 and the output of the mode detection circuit 43 for forwarding to the control circuit 41.

When one of Ain and Bin or both are detected by the TPDC 42 to have a TP higher than the predetermined value, the control circuit 41 sets the value of the frequency designation signal g that is applied to the selection switch 20 of FIG. 1 at "1" so that signal transmission takes place twice within one cycle of CLOCK SIGNAL CLK. In other cases, the control circuit 41 sets the value of the signal g at "0". Additionally, the control circuit 41 sets the value of the signal g at "1" when the current mode is the execution mode of software that deals with image information. On the other hand, the control circuit 41 sets the value of the signal g at "0" when the current mode is the execution mode of software that deals with only character information.

The operation of the present embodiment is described below.

An example case, in which the priority judgement circuit 44 selects the output of the TPDC 42, is described.

The result of the comparison operation performed by the m-bit comparison circuit 42c of the TPDC 42 is fed to the control circuit 41. When a comparison result of the m-bit comparison circuit 42c indicates either the period A, the period B, the period C-1, the period C-2, the period D-1 or the period D-2 (FIGS. 9(a) and 9(b)), the control circuit 41 outputs the signals a–g with information as shown in a truth table of FIG. 10 and FIGS. 11–16. For the signals a–d and Ka–Kd, "ON" indicates contents (information) to close switch circuits while "OFF" indicates information to open switch circuits. For the signals e and f, "h", "i", "j" and "k" indicate that the contents of the signals e and f indicate the signals h, i, j and k of FIG. 1. For the signal g, "1" indicates information that signal selection is performed twice within one cycle of CLOCK SIGNAL CLK and "0" indicates information that signal selection is performed once within one cycle of CLOCK SIGNAL CLK. In other words, the control circuit 41 selects one of signal output patterns (Case-1 to Case-5) shown in the FIG. 10 truth table and FIGS. 11–16.

According to the control signals a–g from the control circuit 41, signals, sequentially differential-transmitted to the first and second signal lines 1 and 2, are ones as shown in FIGS. 11–16 in each of the periods.

Figure 11:
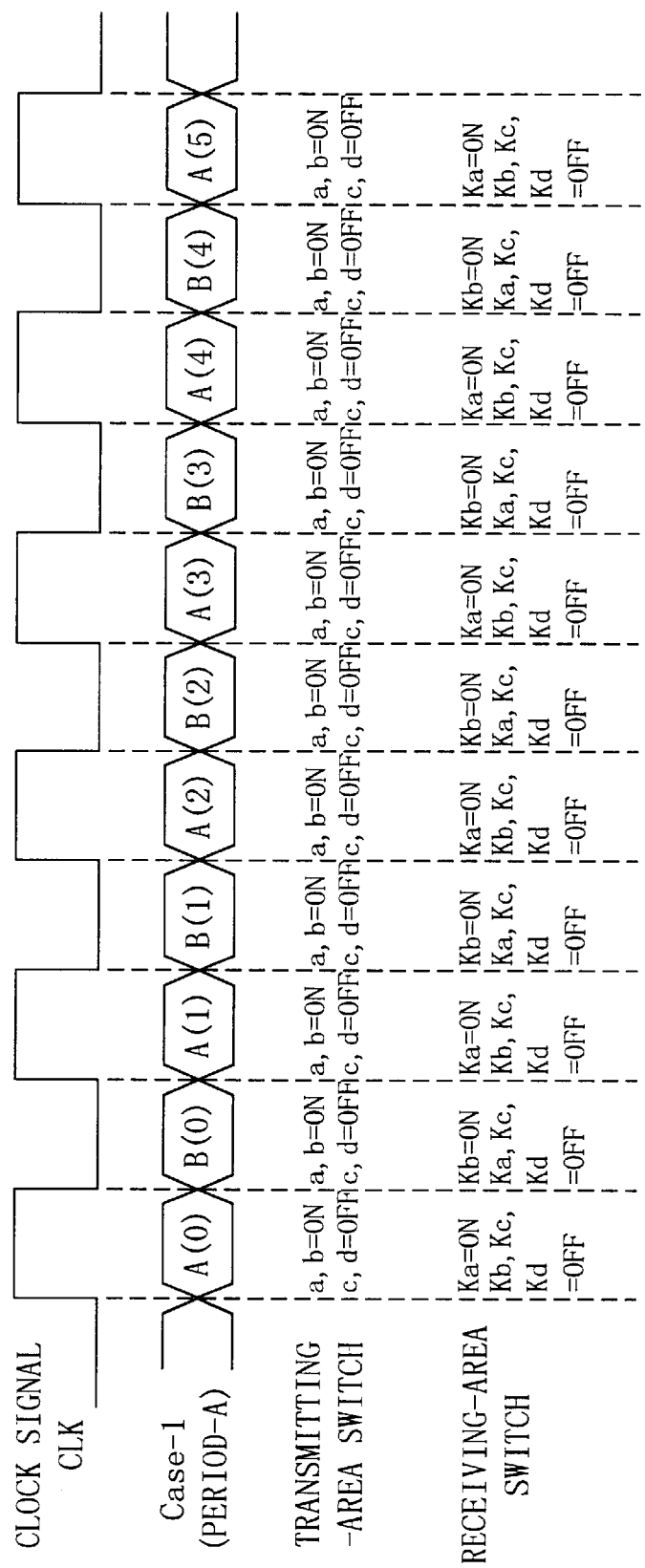
FIG. 11 shows signal transmission of Case 1 in the signal transmission circuit.
Figure 12:
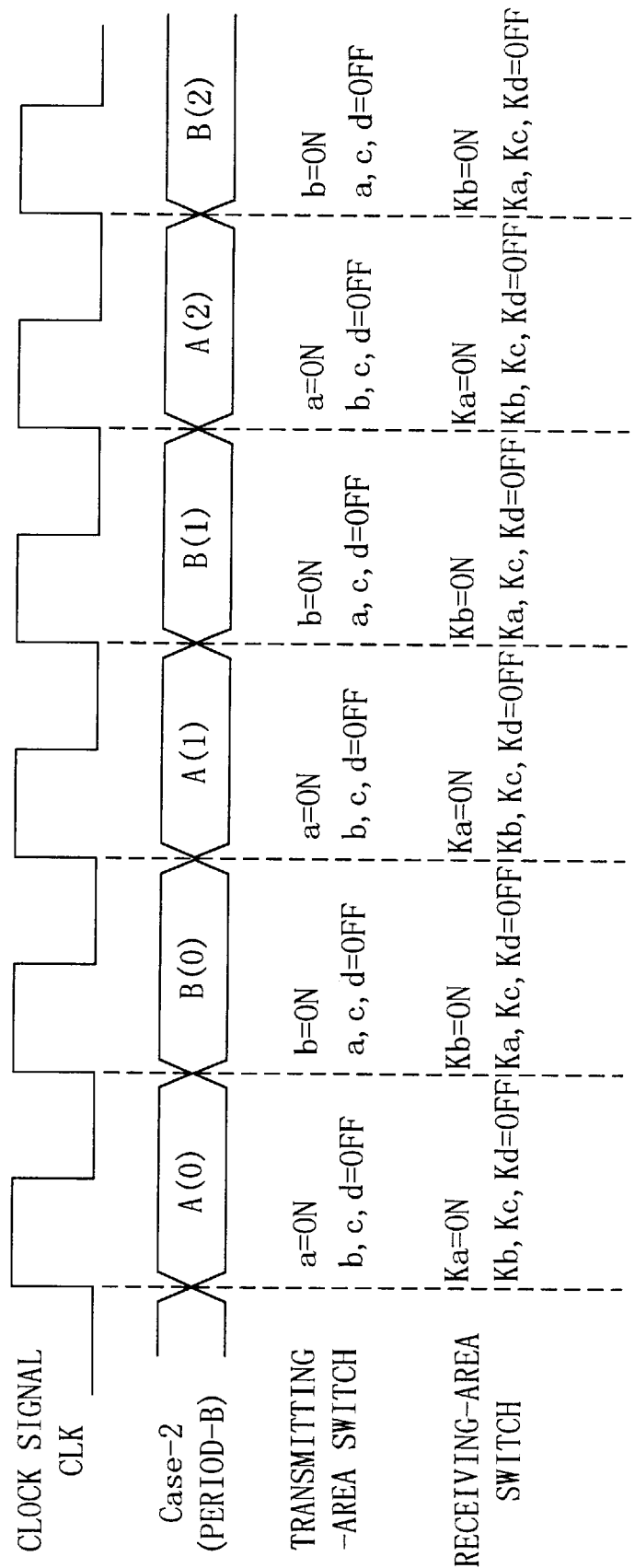
FIG. 12 shows signal transmission of Case 2 in the signal transmission circuit; p

In the period A in which the TP of Ain is as high as that of Bin, the total number of signals to be conveyed per cycle of CLOCK SIGNAL CLK is two (one Ain signal and one Bin signal) and therefore the number of times a signal selection process is performed per cycle of CLOCK SIGNAL CLK is two (FIG. 11). In other words, the transmitting-area switch circuits 5 and 6 are closed, and the MUX 12 receives Ain and /Bin at its terminals O(n) and /E(n), respectively, and the MUX 13 receives Bin and /Ain at its terminals E(n) and /O(n), respectively. On the rising edge of CLK, the MUX 12 selects Ain at the terminal O(n) thereof and the MUX 13 selects /Ain at the terminal /O(n) thereof, and a differential signal pair composed of these selected signals Ain and /Ain is transmitted onto the first and second signal lines 1 and 2. This differential signal pair is received by the differential receiver circuit 30 and is forwarded to the signal lines 17 and 18. The receiving-area switch circuit 32 is closed, and the signal on the signal line 17, i.e., Ain, is stored in the FIFO memory 36. Thereafter, the MUXs 12 and 13 make a switch in signal selection so that the MUX 12 selects /Bin at the terminal /E(n) thereof and the MUX 13 selects Bin at the terminal E(n) thereof and provide the signals selected. A differential signal pair composed of these signals (/Bin and Bin) is transmitted to the first and second signal lines 1 and 2 and is fed to the signal lines 17 and 18 through the differential receiver circuit 30. The receiving-area switch circuit 33 is then closed and the signal on the signal line 18, that is, Bin, is stored in the FIFO memory 36. Subsequent operations are the repetition of the foregoing operations.

In the period B in which the TP of Ain is as low as that of Bin, the total number of signals to be conveyed per cycle of CLK is one (that is, either one Ain is transmitted or one Bin is transmitted per cycle) and therefore the number of times a signal selection process is performed per cycle is one. In other words, the transmitting-area switch circuit 5 is closed and the MUX 12 receives Ain at its terminal O(n) while the MUX 13 receives /Ain at its terminal /O(n). On the rising edge of CLOCK SIGNAL CLK, the MUX 12 selects Ain of the terminal O(n) while the MUX 13 selects /Ain of the terminal /O(n). These signals Ain and /Ain are respectively transmitted to the first and second signal lines 1 and 2 and are received by the differential receiver circuit 30 for forwarding to the signal lines 17 and 18. The receiving-area switch circuit 32 is closed and the signal on the signal line 17, that is, Ain, is stored in the FIFO memory 36. Thereafter, on the falling edge of CLOCK SIGNAL CLK, each of the MUXs 12 and 13 maintains the aforesaid signal selection. On the next rising edge of CLK, the transmitting-area switch circuit 6 is closed and the MUX 12 receives /Bin at its terminal /E(n) while the MUX 13 receives Bin at its terminal E(n). Then, on the rising edge of CLK, the MUXs 12 and 13 make a switch in signal selection so that the MUX 12 selects /Bin at the terminal /E(n) thereof and the MUX 13 selects Bin at the terminal E(n) thereof. These signals /Bin and Bin are respectively transmitted to the first and second signal lines 1 and 2 and are received by the differential receiver circuit 30 for forwarding to the signal lines 17 and 18. The receiving-area switch circuit 33 is closed and the signal on the signal line 18, i.e., Bin, is stored in the FIFO memory 37. On the next falling edge of CLK, each of the MUXs 12 and 13 maintains the foregoing signal selection.

Figure 13:
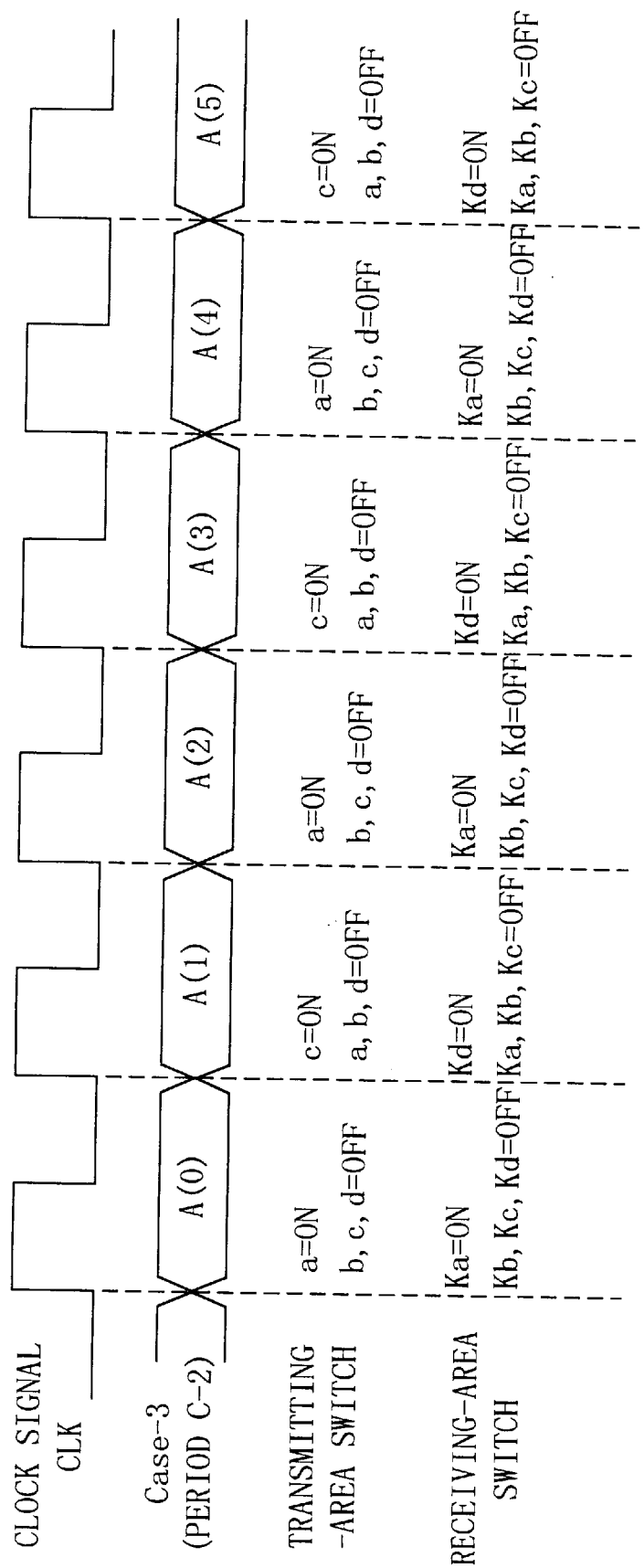
FIG. 13 shows signal transmission of Case 3 in the signal transmission circuit.

In the period C-2 of FIG. 9, only Ain is differential-transmitted. More specifically, one signal Ain is continuously differential-transmitted per cycle of CLOCK SIGNAL CLK (FIG. 13). This operation is the same as the FIG. 12 operation with the exception that there is the difference in switch circuit control therebetween, since after Ain(0) is transmitted its subsequent signal, i.e., Ain(1), is transmitted. In other words, after the transmitting-area switch circuit 5 is closed and the receiving-area switch circuit 32 is closed to transmit Ain(0), the MUXs 12 and 13 make a switch in signal selection on the next rising edge of CLOCK SIGNAL CLK, from the terminal O(n) to the terminal /E(n) and from the terminal /O(n) to the terminal E(n), respectively. In order to correspond to such signal switching, the transmitting-area switch circuit 7 is closed to apply Ain(1) to the terminal E(n) of the MUX 13 as well as to apply /Ain(1) to the terminal /E(n) of the MUX 12. Additionally, the receiving-area switch circuit 35 is closed so that the signal on the signal 18, that is, Ain(1), is stored in the FIFO memory 36.

Figure 14:
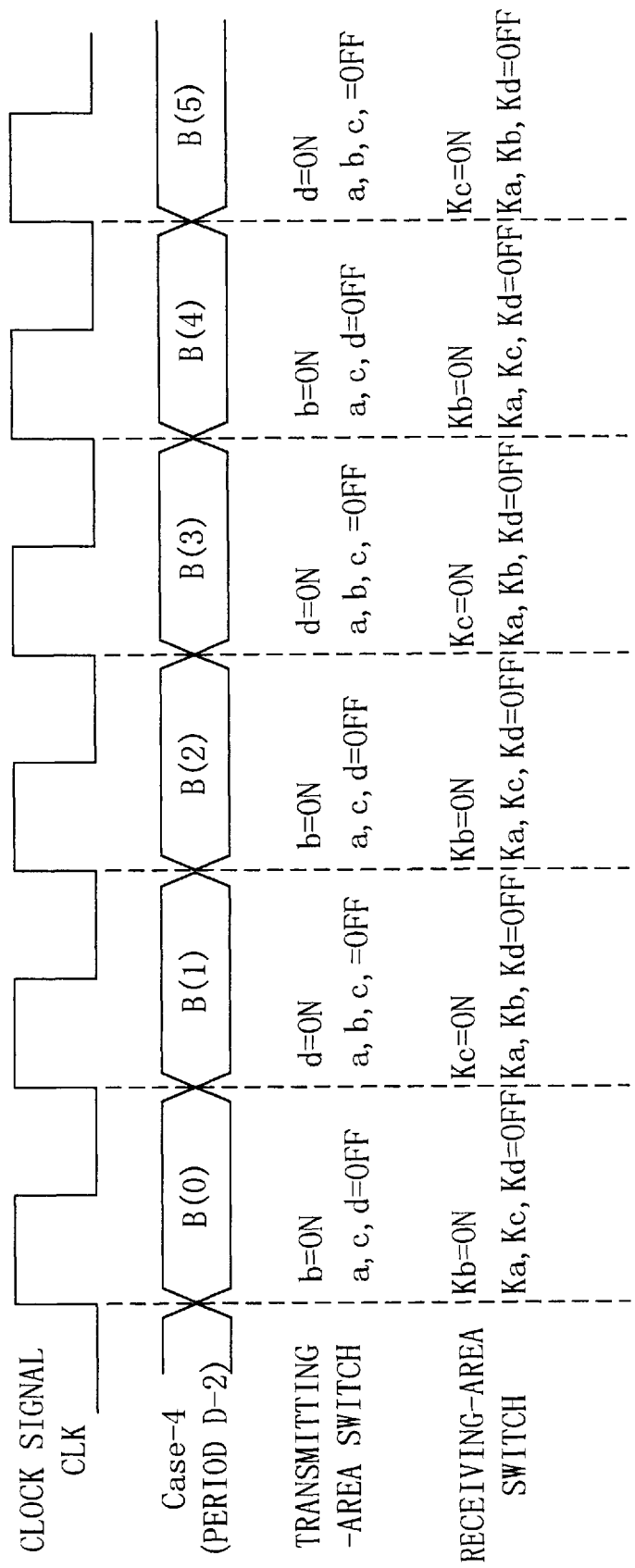
FIG. 14 shows signal transmission of Case 4 in the signal transmission circuit.
Figure 15:
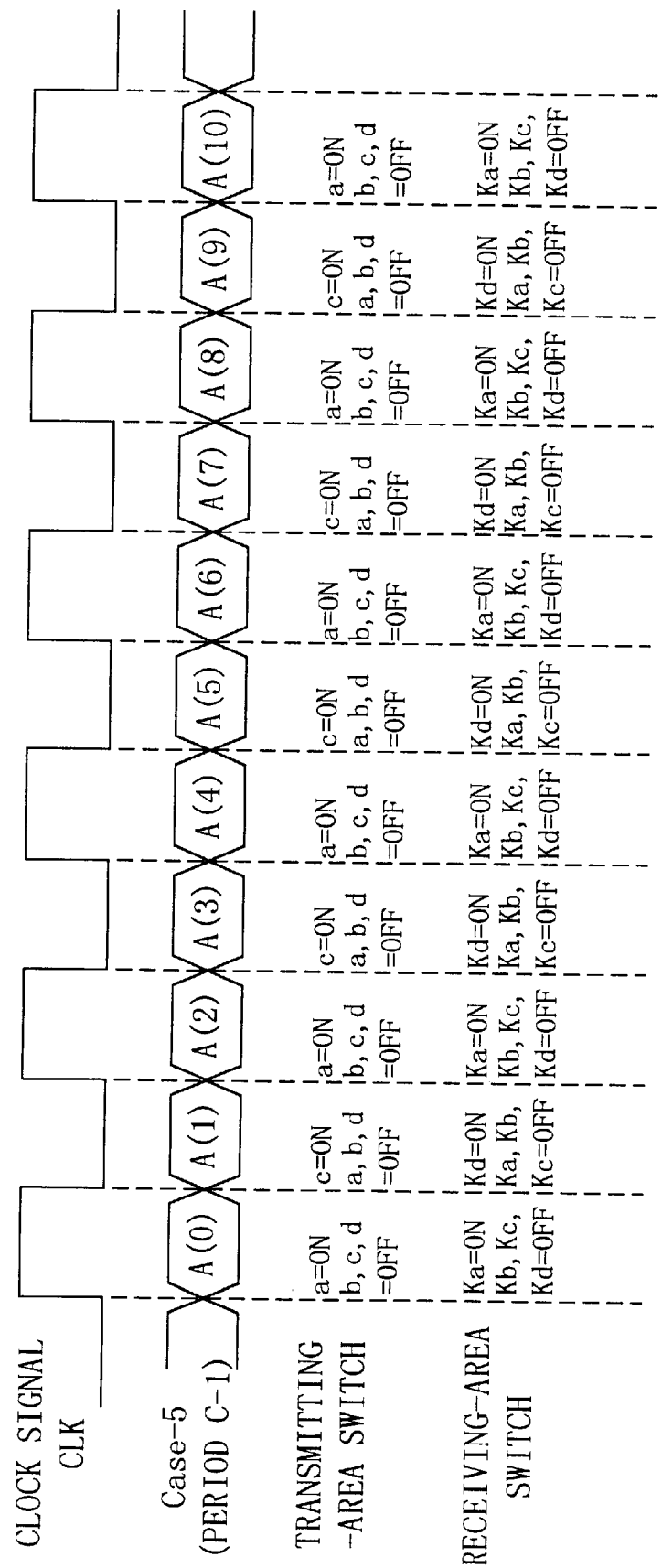
FIG. 15 shows signal transmission of Case 5 in the signal transmission circuit.

In the period D-2 of FIG. 9, only Bin is differential-transmitted. More specifically, one signal Bin is continuously differential-transmitted per cycle of CLOCK SIGNAL CLK (FIG. 14). This transmission operation is the same as the FIG. 13 transmission operation of Ain and therefore the description thereof is not made.

In the period C-1 in which only the TP of Ain is extremely high, only signal Ain is continuously differential-transmitted. More specifically, Ain is continuously differential-transmitted twice per cycle of CLOCK SIGNAL CLK. This transmission operation is the same as the FIG. 13 transmission operation with the exception that, since Ain is transmitted twice per CLK cycle, the switch circuit is switch-controlled at a cycle twice that of the FIG. 13 case.

Figure 16:
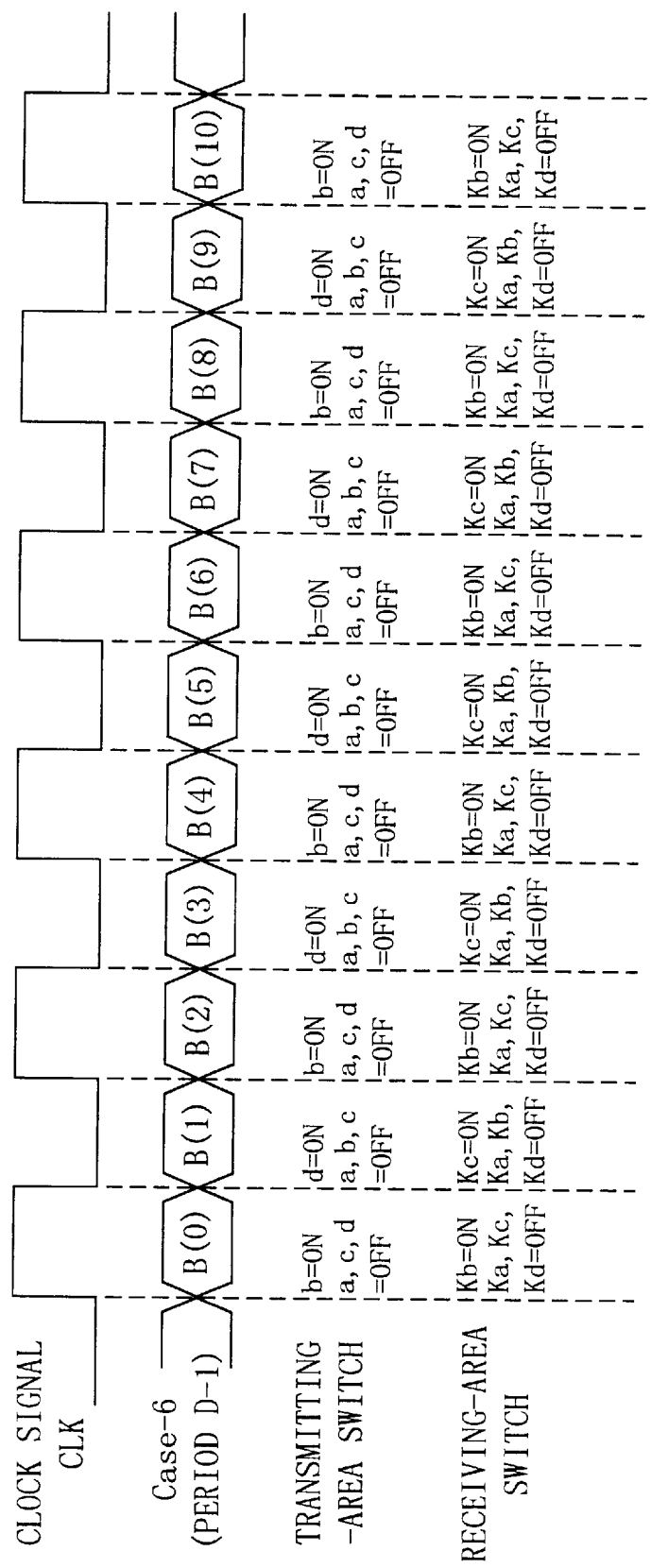
FIG. 16 shows signal transmission of Case 6 in the signal transmission circuit.

In the period D-1 (FIG. 9), only Bin is continuously differential-transmitted. More specifically, Bin is continuously differential-transmitted twice per cycle of CLOCK SIGNAL CLK (FIG. 16). This transmission of Bin is the same as the FIG. 15 transmission of Ain and, for this reason, the description thereof is not made here.

In accordance with the present embodiment, SIGNAL Ain and SIGNAL Bin can be differential-transmitted with a time difference therebetween without having to increase the number of signal lines. This arrangement makes it possible to provide a small, low-cost signal transmission circuit capable of reducing power consumption by means of small amplitude transmission. Additionally, when one of the signals requires no transmission, it is possible to select the other signal with a higher TP and to differential-transmit it in succession, thereby increasing the rate of signal transmission.

Figure 17A:
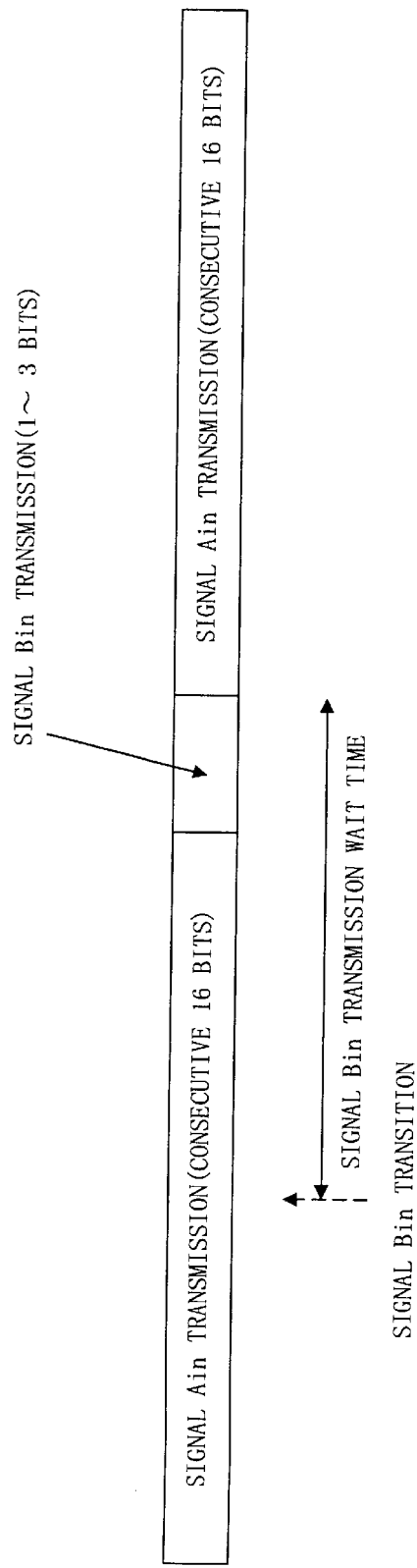
FIG. 17(a) shows an example of the processing of transmission of signals that are low in the transition probability in the signal transmission circuit and FIG. 17(b) shows another example of the processing of transmission of signals that are low in the transition probability in the signal transmission circuit.
Figure 17B:
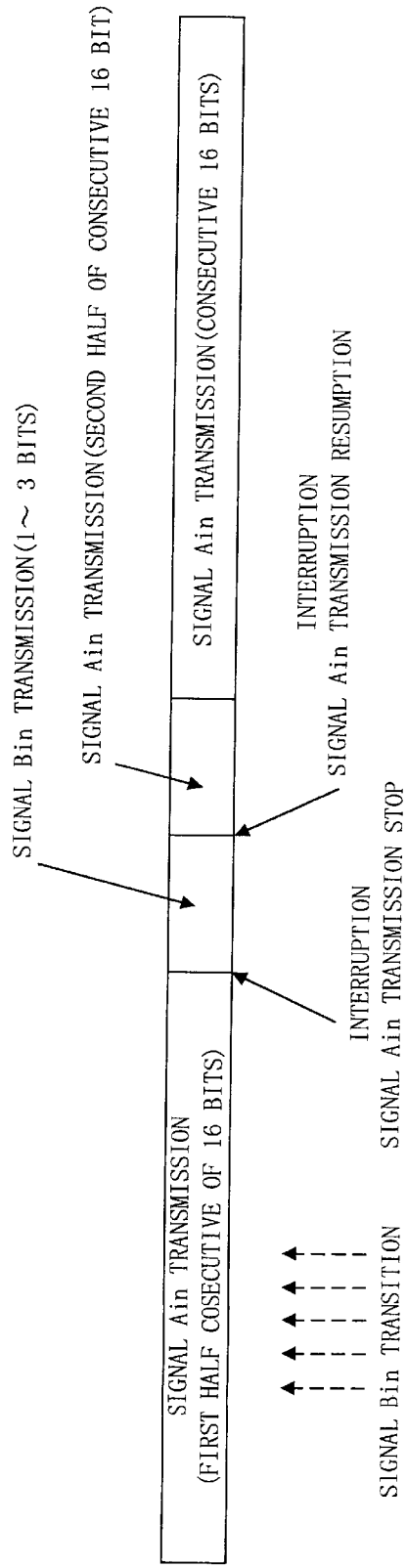

At the time of transmitting one of SIGNALS Ain and Bin that has a higher TP than the other signal, the transmission of the latter signal with a lower TP (for example, Bin) is dealt with in the following two ways. The first technique is as follows. A case, in which the transition probability (TP) is detected for every m bits (for example, m=16), is explained. As shown in FIG. 17(a), when a signal Bin makes a transition at the time of the transmission of a signal Ain, data about the signal Bin is held in an FIFO memory while waiting for the 16-bit continuous transmission of the signal Ain to be completed. After such transmission is completed, the foregoing data about the signal Bin held in the FIFO memory, which is composed of three bits in the figure, is transmitted prior to the continuous transmission of a subsequent signal Ain. The second technique is described with reference to FIG. 17(b). When a signal Bin makes a transition at the time of the continuous transmission of Ain, data about the signal Bin is sequentially held by an FIFO memory. At the point when the number of times Bin makes a transition exceeds a predetermined value (three in the figure), the continuous transmission of Ain is interrupted so that the transmission is temporarily brought to an end and the continuous transmission of data of the signal Bin of three bits is executed. After such transmission of Bin is completed, the remaining of the signal Ain is continuously transmitted.

In the present embodiment, the two inverters 10 and 11 are employed to generate inverted signals of Ain and Bin, that is, /Ain and /Bin. The TPDC (transition probability detection circuit) 42 is used to detect TPs (transition probabilities) with time for Ain and Bin. Thereafter, according to the TPs detected, the choice of which differential signal pair (a pair of Ain and /Ain or a pair of Bin and /Bin) to be transmitted to the first and second signal lines 1 and 2, is made in the MUXs 12 and 13. It is to be noted that the present invention is not limited to such an arrangement. The following arrangement may be used. In the first place, the TP of Ain and Bin is detected. Thereafter, an inverted signal of Ain or Bin, whichever has a higher TP than the other, is generated. The signal, i.e., one that has a higher TP than the other, and its inverted signal are transmitted as a differential signal pair. Additionally, in the case-1 of the present embodiment (FIG. 11), SIGNAL Ain is differential-transmitted using the two signal lines 1 and 2 in the first half of one cycle of CLOCK SIGNAL CLK) and SIGNAL Bin is likewise differential-transmitted in the second half. However, the following commonly-used arrangement may be employed. SIGNAL Ain is single-phase transmitted using the first signal line 1 in one CLK cycle while SIGNAL Bin is single-phase transmitted using the second signal line 2. To sum up, the present invention is characterized in that, when one of the two signal lines 1 and 2 is free or vacant, such a free signal line is utilized and signals to be conveyed are differential-transmitted using both of the signal lines.

Modification

Figure 18:
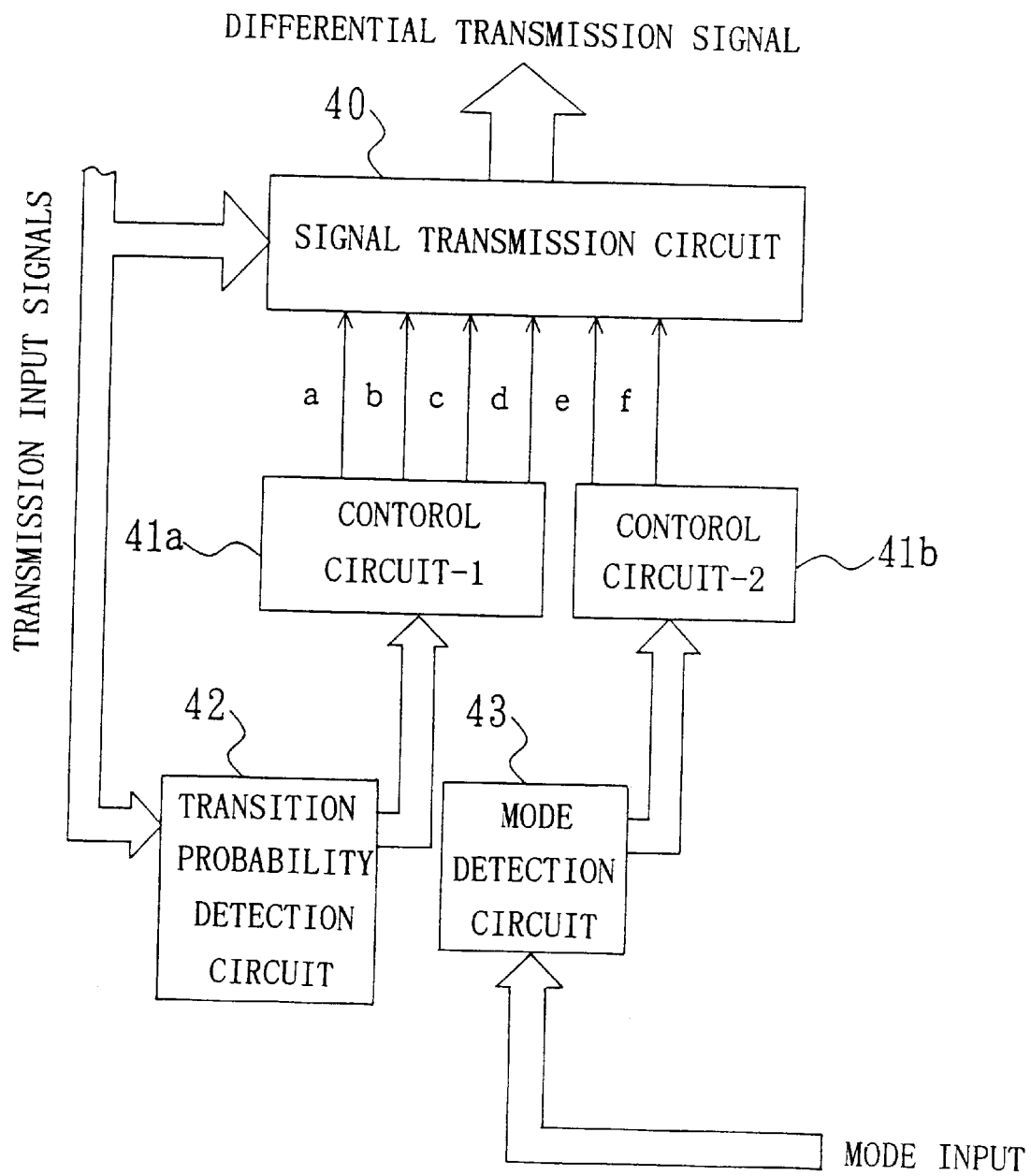
FIG. 18 is a circuit diagram of a modification of the control circuit of the first embodiment.

With reference to FIG. 18, a modification of the first embodiment is shown. In the first embodiment, the information (contents) of the frequency designation signal g which designates the number of times signal selection is performed in a period of one cycle of the clock signal, is determined by whether the transition probability difference exceeds a predetermined value. Unlike the first embodiment, in this modification the information of the signal g is determined depending upon the output of the mode detection circuit 43.

Referring to FIG. 18, the control circuit is divided into a first control circuit 41a and a second control circuit 42a. The first control circuit 41a generates the control signals a–d for the switch circuits according to the output from the TPDC 42. On the other hand, the second control circuit 41b determines the information (contents) of the frequency designation signal g according to the output from the mode detection circuit 43. For example, at the time of image processing, its image processing mode is detected and the information of the signal g is determined such that signal selection is performed twice within one cycle of the clock signal, and the signals e and f are produced in order that a signal pair (the signals h and i) is selected to improve the signal transmission rate. On the other hand, at the time of document creation, the information of the signal g is determined such that signal selection is performed once within one cycle of the clock signal, and the signals e and f are produced in order that a signal pair (the signals j and k) is selected so that the signal transmission rate is a regular signal transmission rate.

SECOND EMBODIMENT

Figure 19:
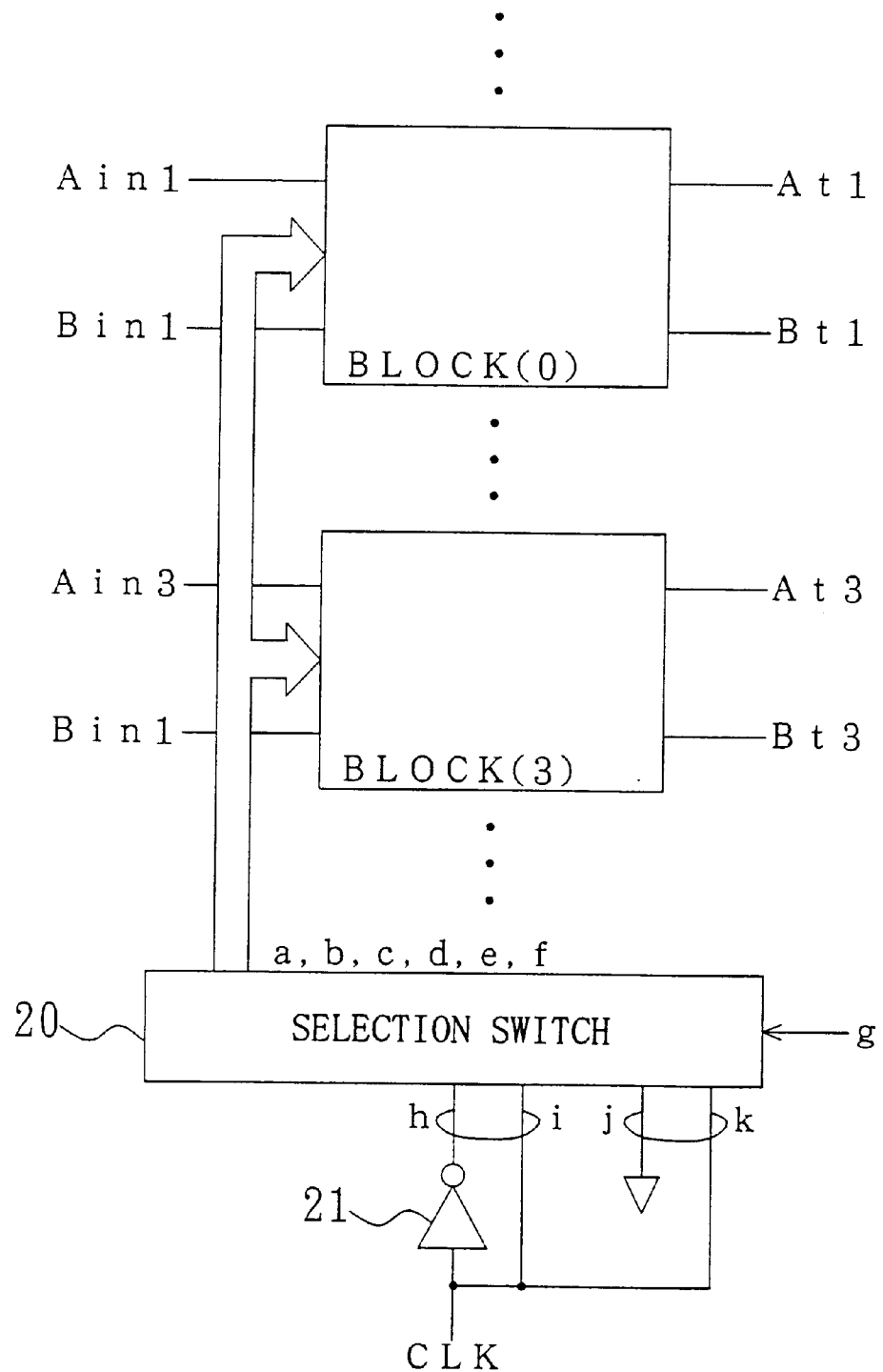
FIG. 19 depicts the configuration of a signal transmission circuit in accordance with a second embodiment of the present invention.

A second embodiment of this invention is shown in FIG. 19.

FIG. 19 shows a plurality of blocks BLOCK(0), BLOCK (1), BLOCK(2), BLOCK(3) and so on. Each BLOCK comprises a signal transmission circuit without the selection switch 20 of FIG. 1.

The BLOCKs receive the control signals a–f from the selection switch 20 and are common-controlled.

Figure 20:
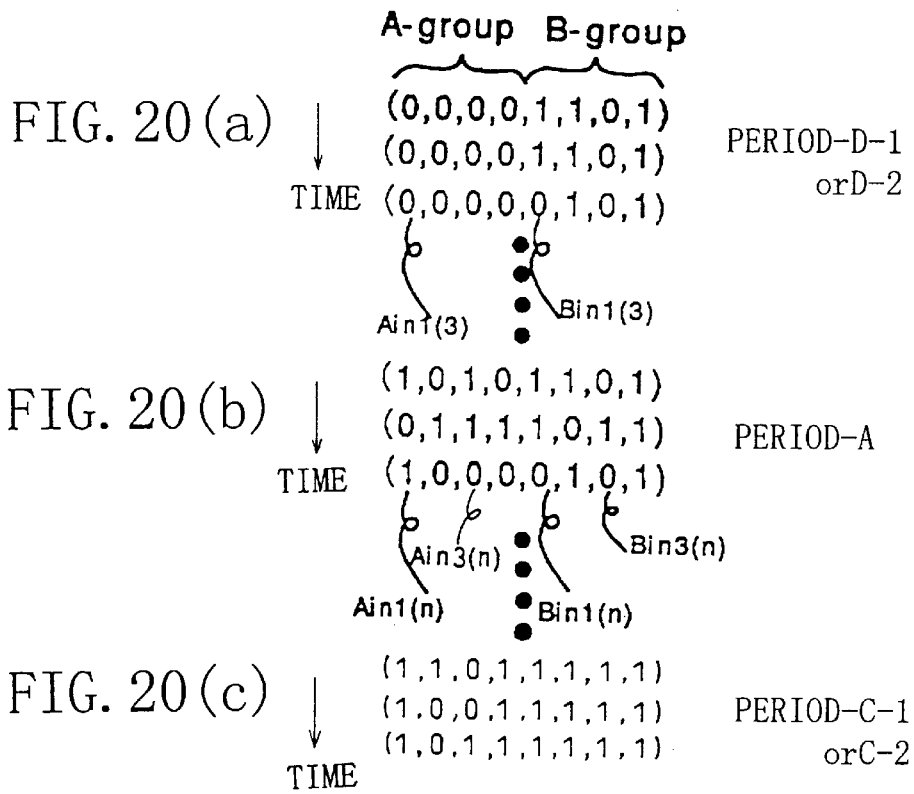
FIG. 20(a) shows an example case in which the transition probability of signals of a signal group A is lower than the transition probability of signals of a signal group B in the signal transmission circuit of the second embodiment.
FIG. 20(b) shows an example case in which the transition probabilities are approximately the same.
FIG. 20(c) shows an example case in which the transition probability of the signal group A is higher than that of the signal group B.

FIG. 20 illustrates the transition of signals to be conveyed. These signals are roughly classified into two signal groups, namely a signal group A and a signal group B. Each signal group A and B is composed of image data. These two signal groups A and B are greatly different from each other in the TP (transition probability) distribution characteristic (see FIG. 9(b)). Each signal group A and B is a group of signals formed of a plurality of bits (four bits in the figure). A signal of the one signal group and its corresponding signal of the other signal group are transmitted as a signal Ain and as a signal Bin, respectively. If signals of the k-th bit are signified as Aink and as Bink, respectively, then Ain1 and Bin1, which are signals of the first bit, are differential-transmitted using BLOCK(0) of FIG. 19, as shown in FIG. 20, and Ain3 and Bin3, which are signals of the third bit, are differential-transmitted using BLOCK(3) of FIG. 19. In the figure, a figure enclosed in parentheses such as "(3)" of Ain1(3) and "(n)" of Bin3(n) is an ordinal number, so that Ain1(3) is the third signal and Bin3(n) is the n-th signal.

With reference to FIG. 20(a), there is shown the period D-1 or the period D-2 (see FIG. 9) in which the TP of the signal group B is higher than the TP of the signal group A. With reference to FIG. 20(b), there is shown the period A in which the TP of the signal group A and the TP of the signal group B are approximately the same. With reference to FIG. 20(c), there is shown the period C-1 or the period C-2 in which the TP of the signal group A is higher than the TP of the signal group B. In a case where the number of groups is three or more, these groups are divided into two parts. The signals a–g are set for each part.

Figure 21:
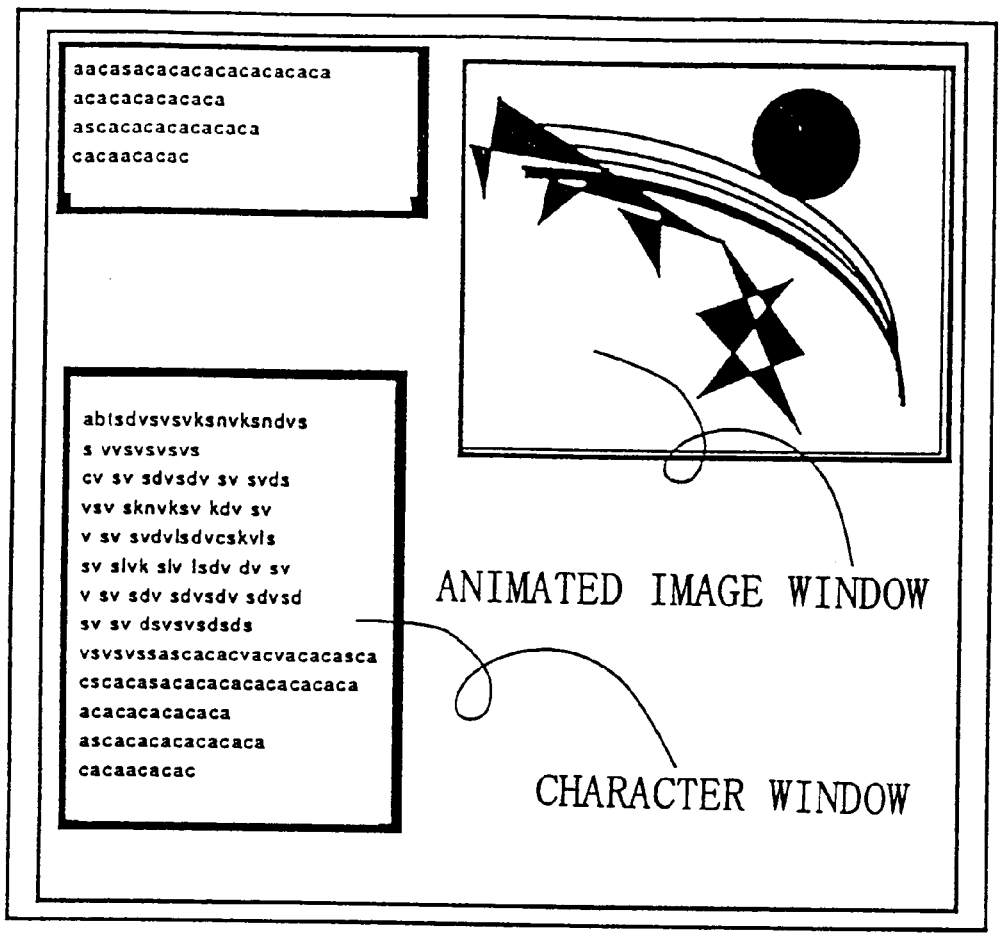
FIG. 21 shows a character window and an animated image window of the signal transmission circuit of the second embodiment.

Both signals forming the signal group A and signals forming the signal group B are image data (FIG. 21). One of these two signal groups A and B may be window information for characters while the other signal group may be window information for animated image display. Additionally, as shown in FIG. 22, one of the signal groups may be luminance signal information while the other signal group may be chrominance signal information. Further, one of the signal groups may be even-numbered field information while the other signal group may be odd-numbered field information.

First Modification of the Signal Generation Means

In the foregoing description, the inverters 11 and 12 are used as signal generation means for generating mismatch signals that disagree in time with Ain and Bin, to generate inverted signals of Ain and Bin (/Ain and /Bin). In the present modification, delay elements are arranged to generate delay signals that are delayed in time with signals to be conveyed.

Figure 23:
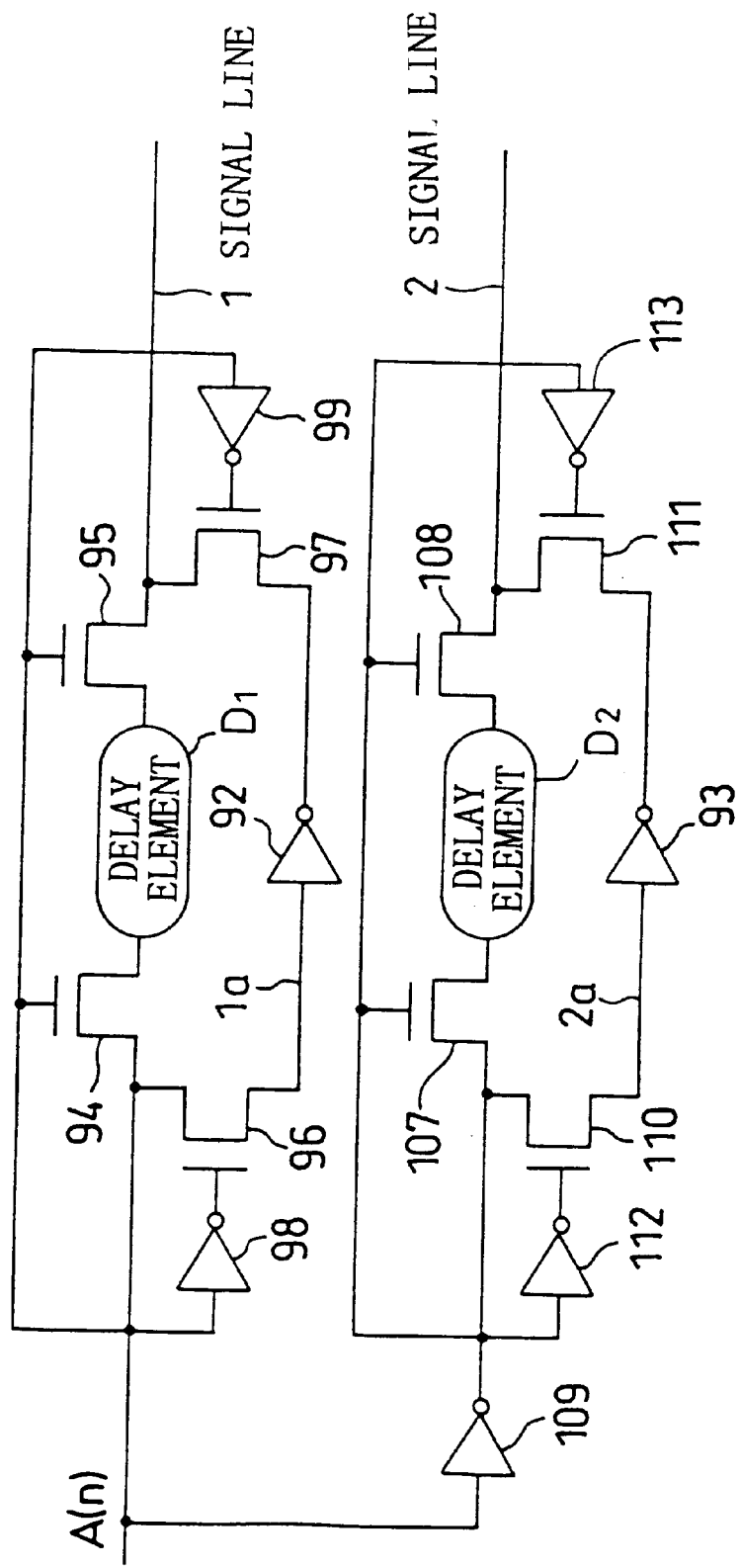
FIG. 23 shows a first modification of the configuration of a signal generation circuit in the signal transmission circuit according to the present invention.

FIG. 23 shows a signal generation means in accordance with the present modification. A delay element D1 (first delay signal generation circuit) and a delay element D2 (second delay signal generation circuit) are provided in series with the signal lines 1 and 2, respectively. A signal line 1a is arranged in parallel with the signal line 1, turning aside from the delay element D1. Likewise, a signal line 2a is arranged in parallel with the signal line 2, turning aside from the delay element D2. The signal line 1a is provided with an inverter 92. The signal line 2a is provided with an inverter 93. N-channel transistors 94 and 95 turn on when A(n), which is a signal to be conveyed, is "1" and the delay element D1 is connected to the signal line 1. When A(n) is "0", n-channel transistors 96 and 97 turn on by the output of inverters 98 and 99 (the inverted value of A(n)) and the inverter 92 is connected to the signal line 1. When A(n) to be conveyed is "0", n-channel transistors 107 and 108 turn on by the output of an inverter 109 (the inverted value of A(n)) and the delay element D2 is connected to the signal line 2. An n-channel transistor 110 receives the output of an inverter 112 which inverts the output of the inverter 109 and an n-channel transistor 111 receives the output of an inverter 113 which inverts the output of the inverter 109, and these n-channel transistors 110 and 111 turn on when A(n) is "1" so that the inverter 93 is connected to the signal line 2.

Figure 24:
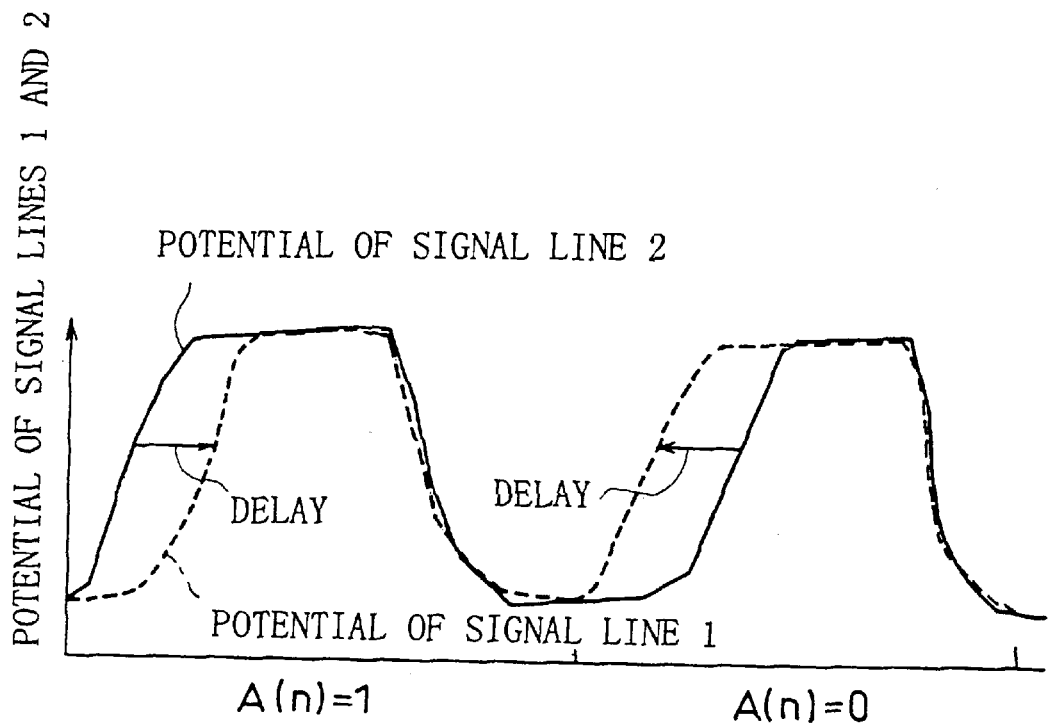
FIG. 24 is a diagram useful in understanding the operation of the first modification.

A case, in which A(n)="1", is described with reference to FIG. 24. In such a case, a signal A(n), which is transmitted over the signal line 1, passes through the delay element D1 while on the other hand a signal A(n), which is transmitted over the signal line 2, passes through two inverters, namely the inverters 109 and 93. For this reason, the signal A(n) of the signal line 1 is delayed in time with respect to the signal A(n) of the signal line 2. On the other hand, a case, in which A(n)="0", is described. A signal A(n), which is transmitted over the signal line 1, passes through the inverter 92 while a signal A(n), which is transmitted over the signal line 2, passes through the inverter 109 and delay element D2. For this reason, the signal A(n) of the signal line 2 is delayed in time with respect to the signal A(n) of the signal line 1.

Second Modification of the Signal Generation Means

Figure 25:
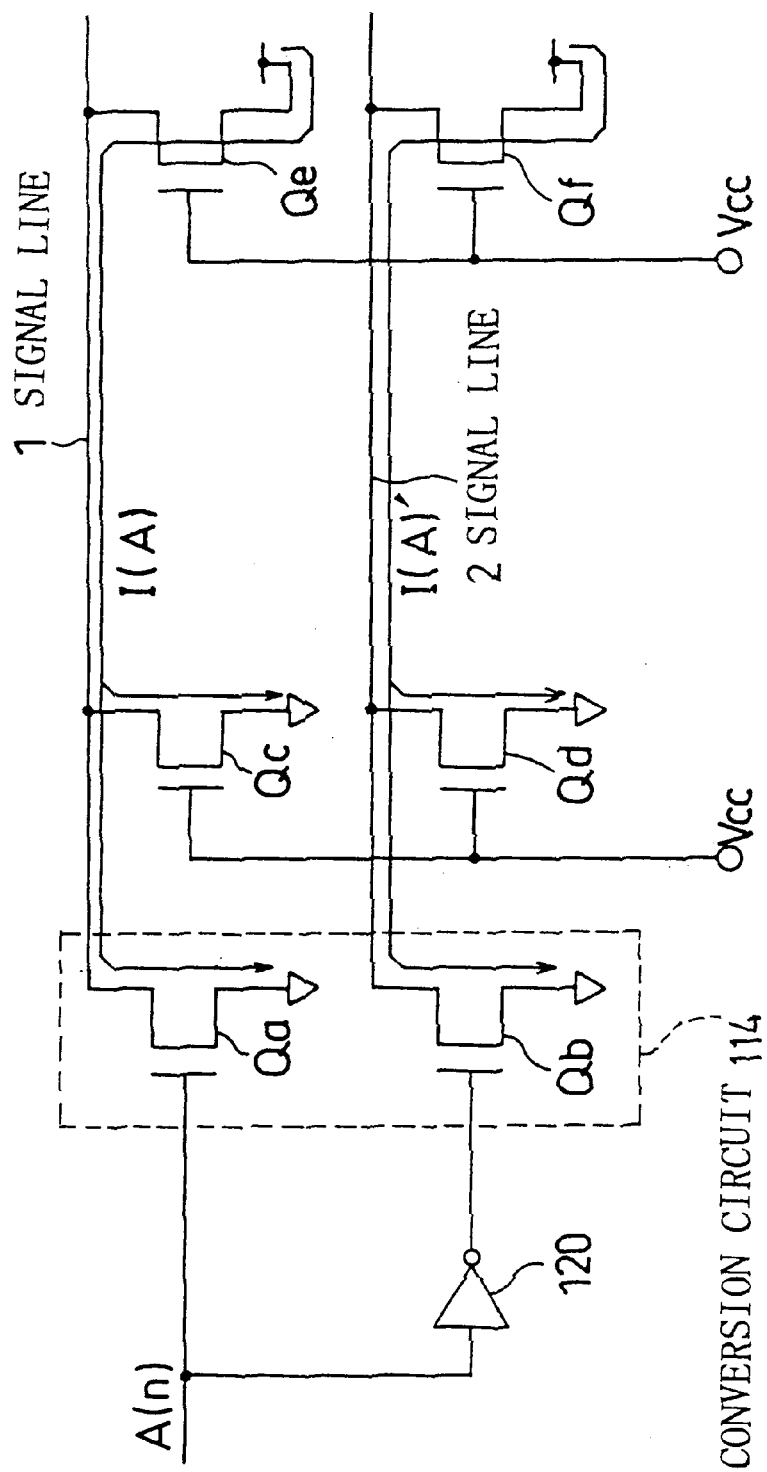
FIG. 25 shows a second modification of the signal generation circuit's configuration.

Referring now to FIG. 25, a second modification of the signal generation means is illustrated. In the present modification, an impedance change circuit is provided which generates as a mismatch signal a signal as a result of changing the current amount of a signal to be conveyed.

A very small current I(A) flows through the signal line 1 because n-channel transistors Qe and Qc are always in the on state. Likewise, a very small current I(A)' flows through the signal line 2 because n-channel transistors Qf and Qd are always in the on state.

When in the signal line 1 An(n), which is a signal to be conveyed, is "1", an n-channel transistor Qa turns on and the signal line 1 is grounded. When in the signal line 2 A(n) is "0", an n-channel transistor Qb turns on by a signal resulting from inverting the value of the signal A(n) by an inverter 120 and the signal line 2 is grounded. The transistors Qa and Qb are great in capacitance. The transistor Qc and Qd are small in capacitance. The transistors Qa and Qb together constitute an impedance change circuit 114 (first and second current-amount change circuits) for changing the impedance of the signal lines 1 and 2.

Figure 26:
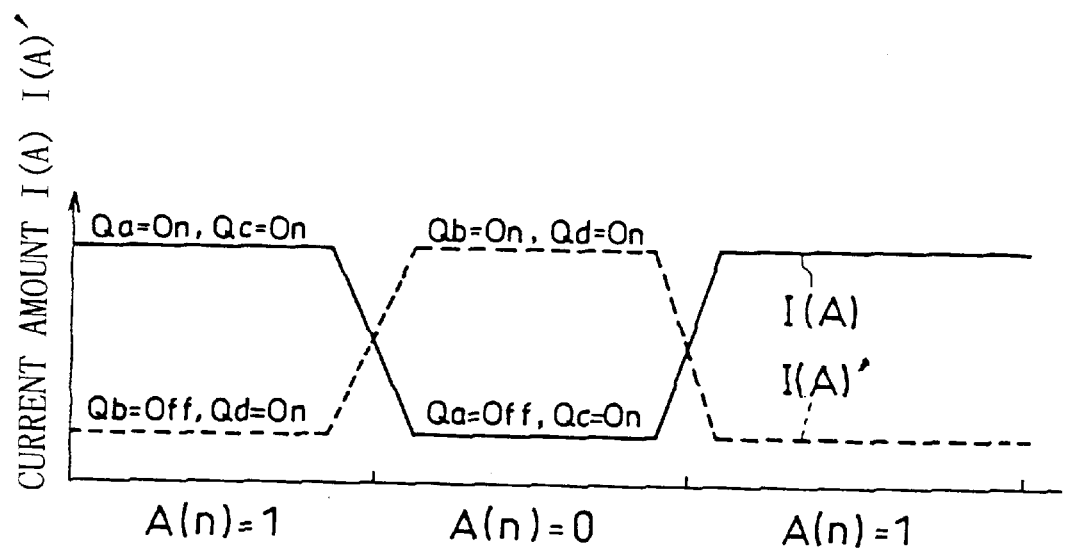
FIG. 26 is a diagram useful in understanding the operation of the second modification.

In the present modification, when A(n), which is a signal to be transmitted, is "1", the amount of the current I(A)' flowing through the signal line 2 is small while the amount of the current I(A) flowing through the signal line 1 increases because the transistor Qa turns on (FIG. 26). On the other hand, when A(n) is "0", the amount of the current I(A) flowing through the signal line 1 is small while the amount of the current I(A)' flowing through the signal line 2 increases because the transistor Qb turns on. The difference between the current I(A) and the current I(A)' depends upon the receiving sensitivity of the receiver circuit. It is required that the difference is about 0.1 microampere or more.

The signal generation means is not limited to the present modification. For example, signals, which are opposite in the change direction or current direction to signals to be conveyed, may be generated.

THIRD EMBODIMENT

Figure 27:
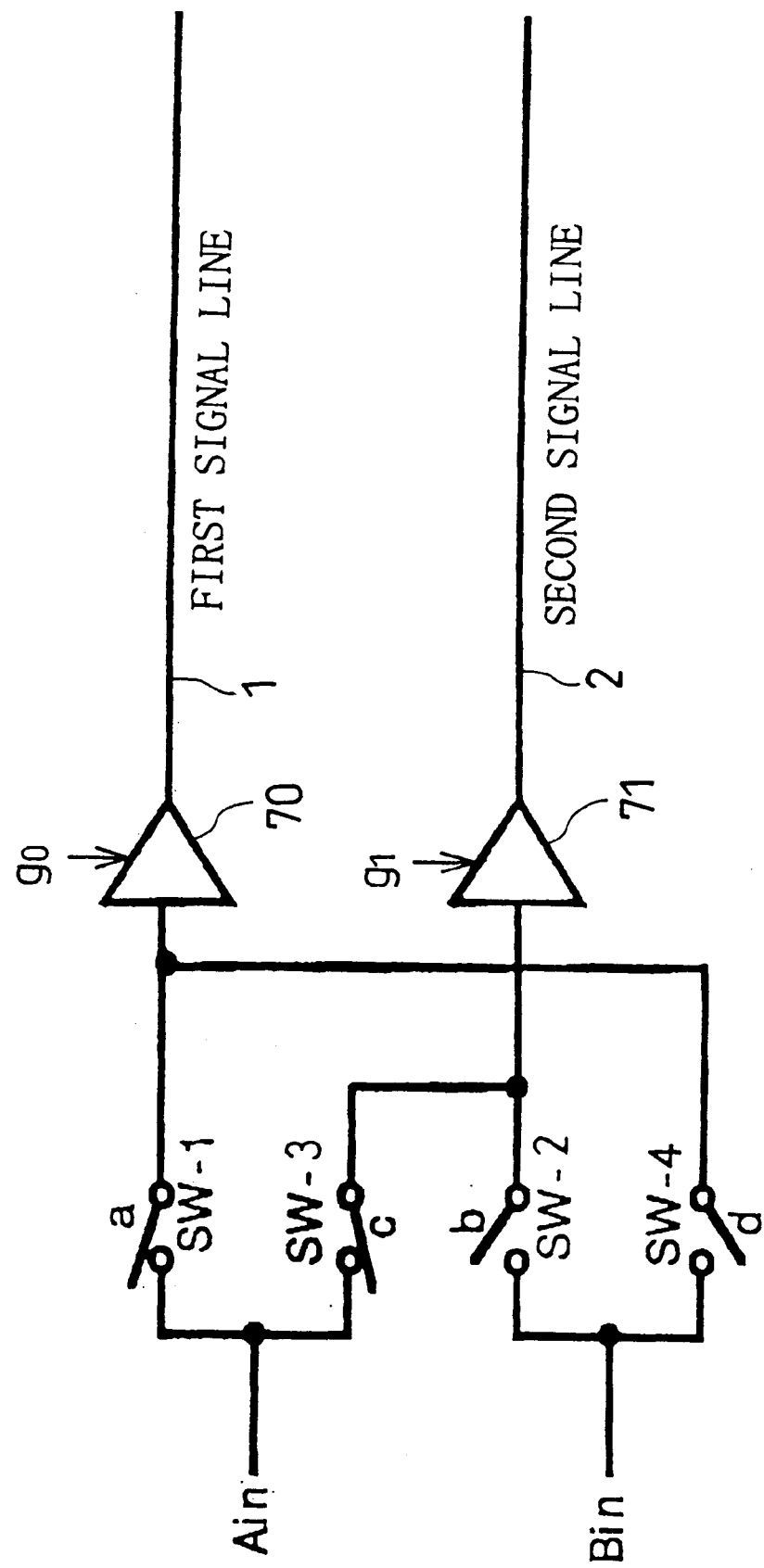
FIG. 27 depicts the configuration of a signal transmission circuit in accordance with a third embodiment of the present invention.

FIG. 27 shows a third embodiment of the present invention. In accordance with the present embodiment, even in the case of single-line signal transmission, signal lines are shared so as to increase the rate of signal transmission.

Figure 34:
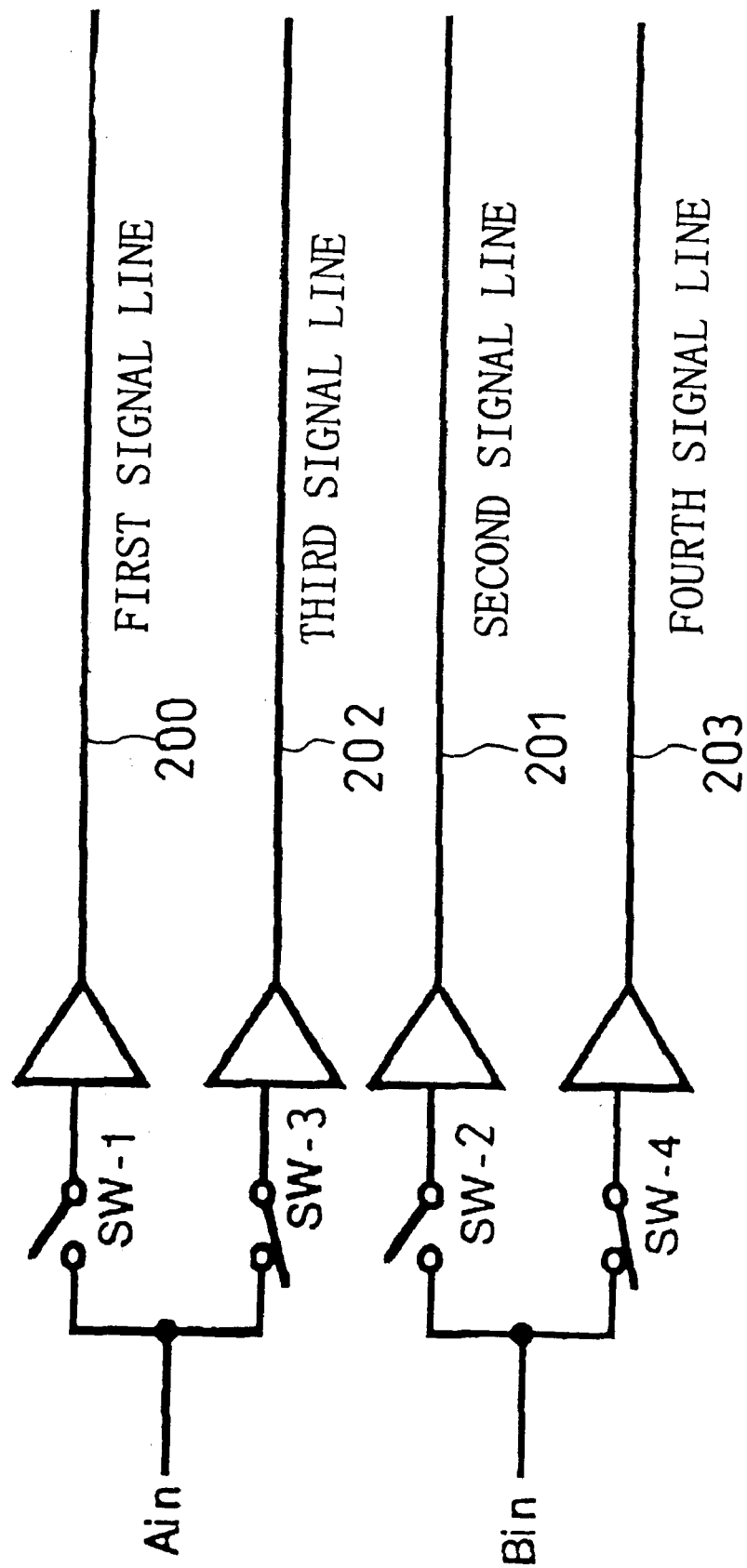
FIG. 34 is a proposal example for increasing the rate of signal transmission by means of single-line transmission.
Figure 35:
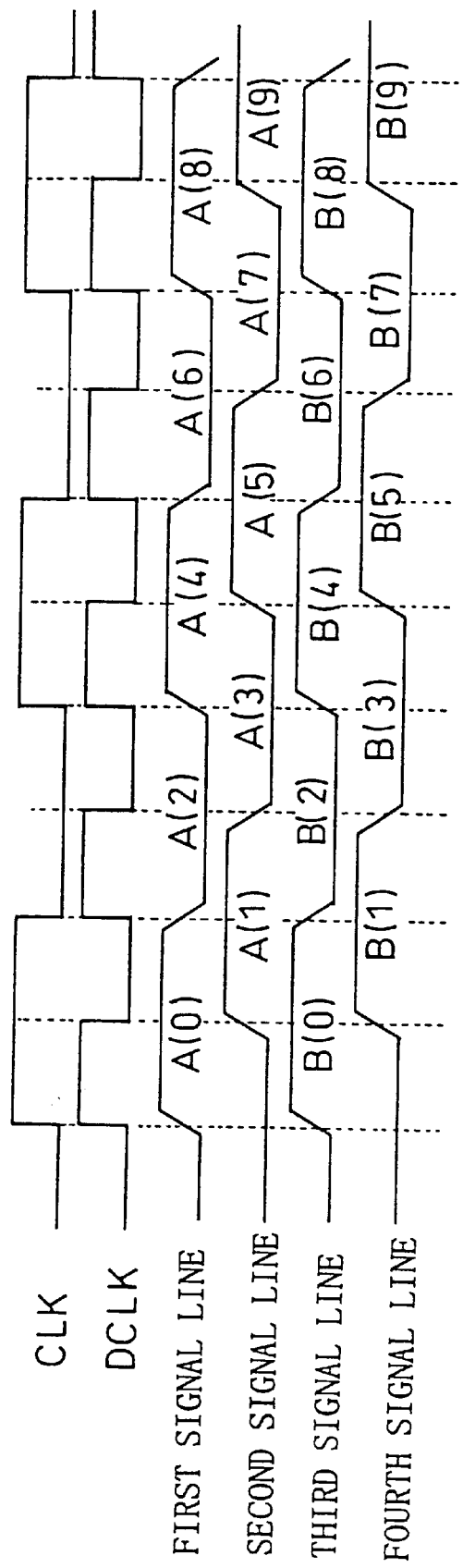
FIG. 35 shows a manner of transmitting signals in the proposal example.
Figure 36:
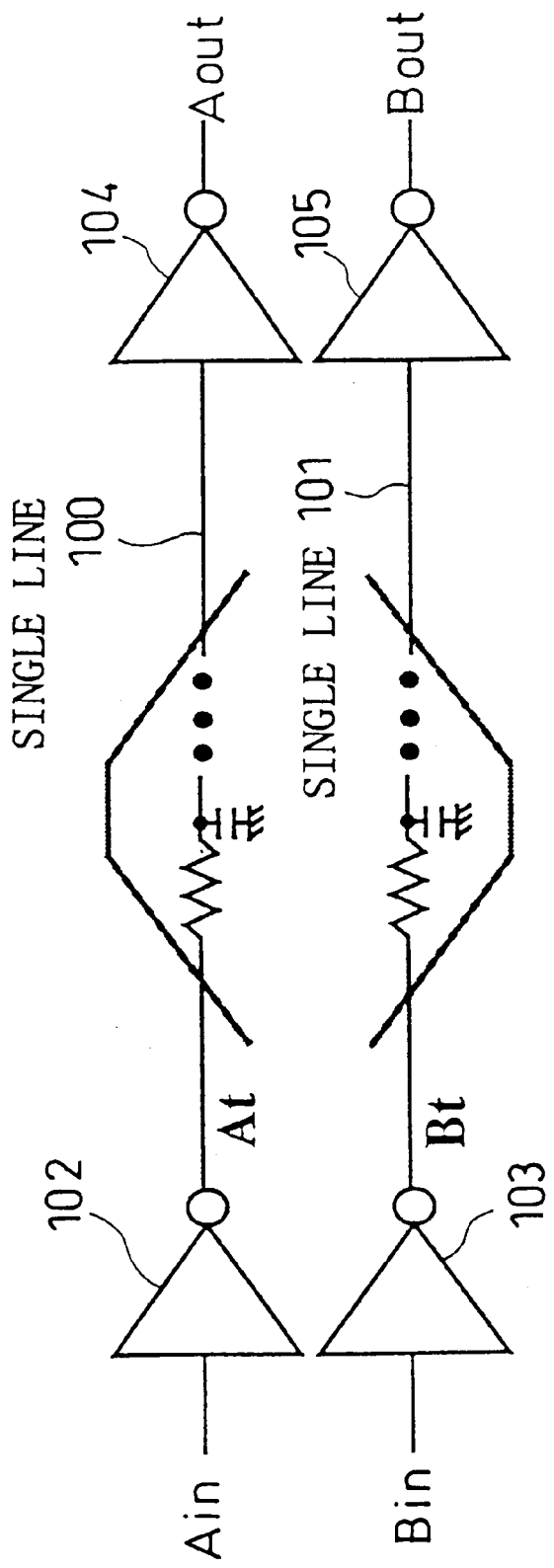
FIG. 36 depicts a conventional single-line transmission example.
Figure 37:
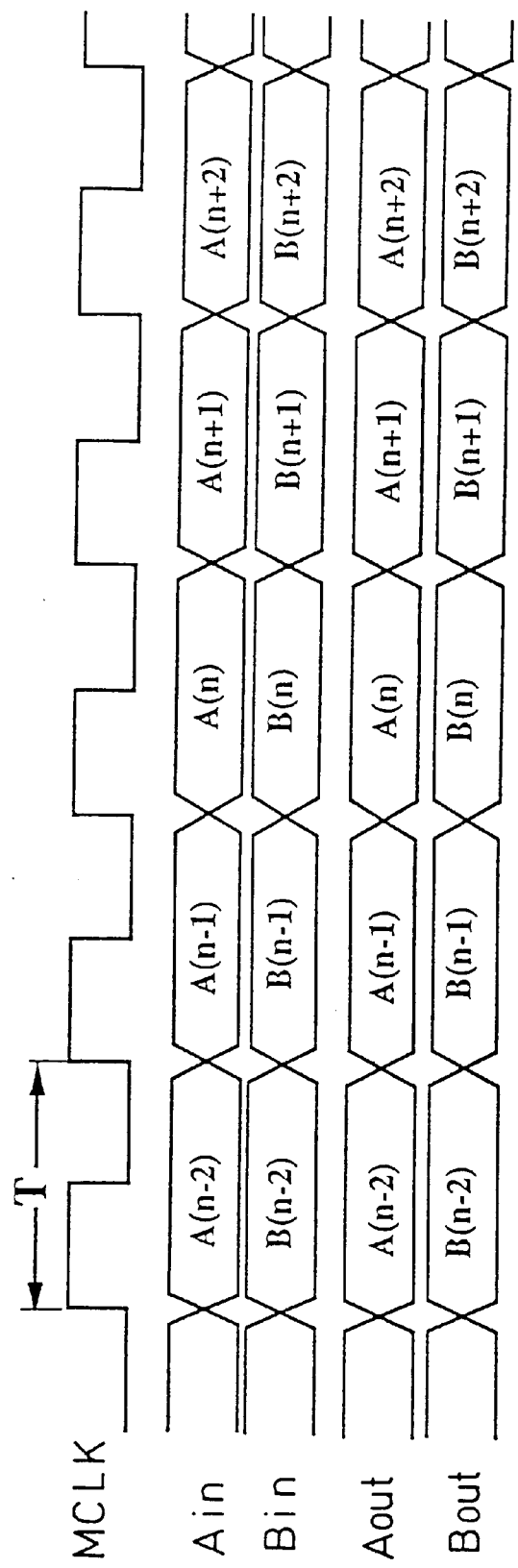
FIG. 37 is a diagram useful in understanding the operation of the conventional single-line transmission.

In a general concept, when a first signal line 200 corresponding to the first signal Ain and a second signal line 201 corresponding to the second signal Bin are provided (FIG. 34), a third signal line 202 for Ain and a fourth signal line 203 for Bin are further provided. A clock signal DCLK, the cycle of which is twice that of the clock signal CLK, is generated (FIG. 35). On the rising edge of CLOCK SIGNAL DCLK, a switch SW-1 is closed so that Ain(0) is sent to the first signal line 200. Thereafter, on the falling edge of CLOCK SIGNAL DCLK, the switch SW-1 is opened while a switch SW-2 is closed so that Ain(1) is sent to the third signal line 202. Such operation is repeatedly performed. Also, for the case of Bin, the same operations are performed. Although such a arrangement by the general concept produces the advantage that the signal transmission rate is improved, there is produced the disadvantage that the number of signal lines increases. Accordingly it is an object of the present embodiment to provide a high signal transmission rate without having to increase the number of signal lines.

In FIG. 27 showing the present embodiment, signal lines are limited to the first and second signal lines 1 and 2. The first signal line 1 is driven by a first driver 70 and the second signal line 2 is driven by a second driver 71. The first driver 70 receives a drive signal g0 and drives the first signal line 1 on the rising edge of g0. The second driver 71 receives another drive signal g1 and drives the signal line 2 on the rising edge of g1.

Referring still to FIG. 27, there are provided four switch circuits, SW-1, SW-2, SW-3 and SW-4. The first switch circuit SW-1 (first switch means) sends Ain to the first driver 70. The second switch circuit SW-2 (second switch means) sends Bin to the second driver 71. The third switch circuit SW-3 (third switch means) sends Ain to the second driver 71. The fourth switch circuit SW-4 (fourth switch means) sends Bin to the first driver 70.

For example, the transmission of the first signal Ain when the transmission of the second signal Bin is not called for is illustrated. In such a case, the drive signal g0 is made to act as the clock signal DCLK whose cycle is twice that of the clock signal CLK and the drive signal g1 is made to act as the inverted signal /DCLK (the inverted signal of DCLK), and the first and third switch circuits SW-1 and SW-3 are closed. As a result, Ain(0) is sent to the first signal line 1 on the rising edge of DCLK and the subsequent signal Ain(1) is sent to the second signal line 2 on the falling edge of DCLK. This is the same in the case of the transmission of the second signal Bin. The first and second signal lines 1 and 2 are shared between Ain and Bin, which enables single-line transmission of Ain and Bin while improving the signal transmission rate.

Figure 28:
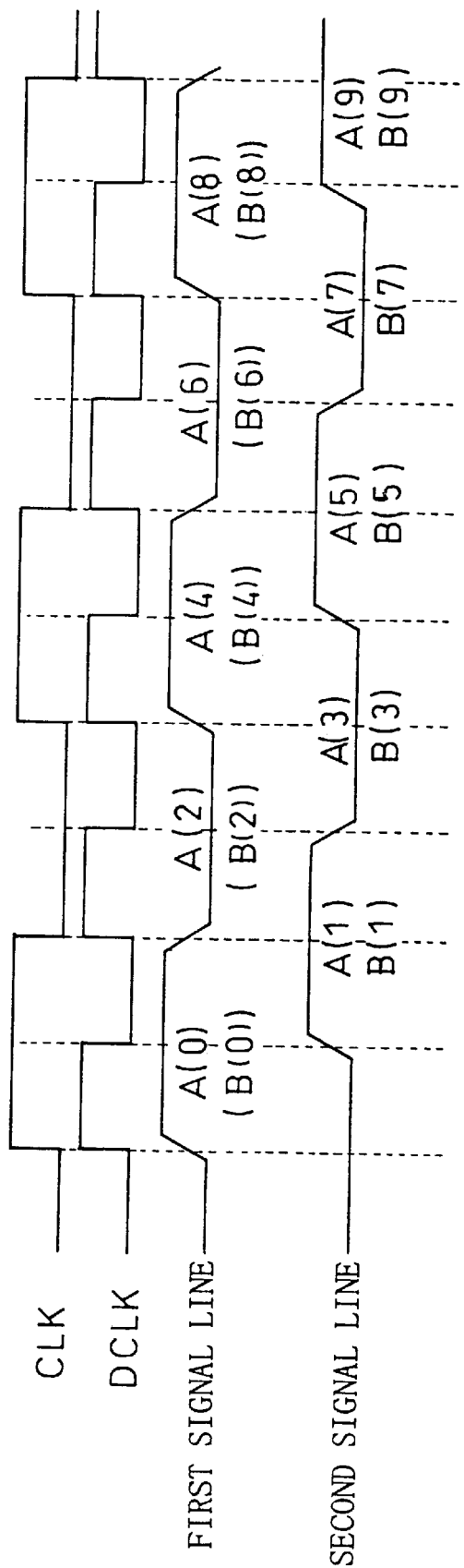
FIG. 28 shows a basic manner of transmitting signals in the signal transmission circuit of the third embodiment.

FIG. 28 shows a case in which a series of first signals, i.e., A(0), A(1), A(2), A(3) and so on, are transmitted in that order. When the transmission order of signals is different from the input order thereof (for example, when it is determined such that A(1), A(0), A(3) and A(2) are transmitted in that order), they are simply transmitted as determined.

Figure 29:
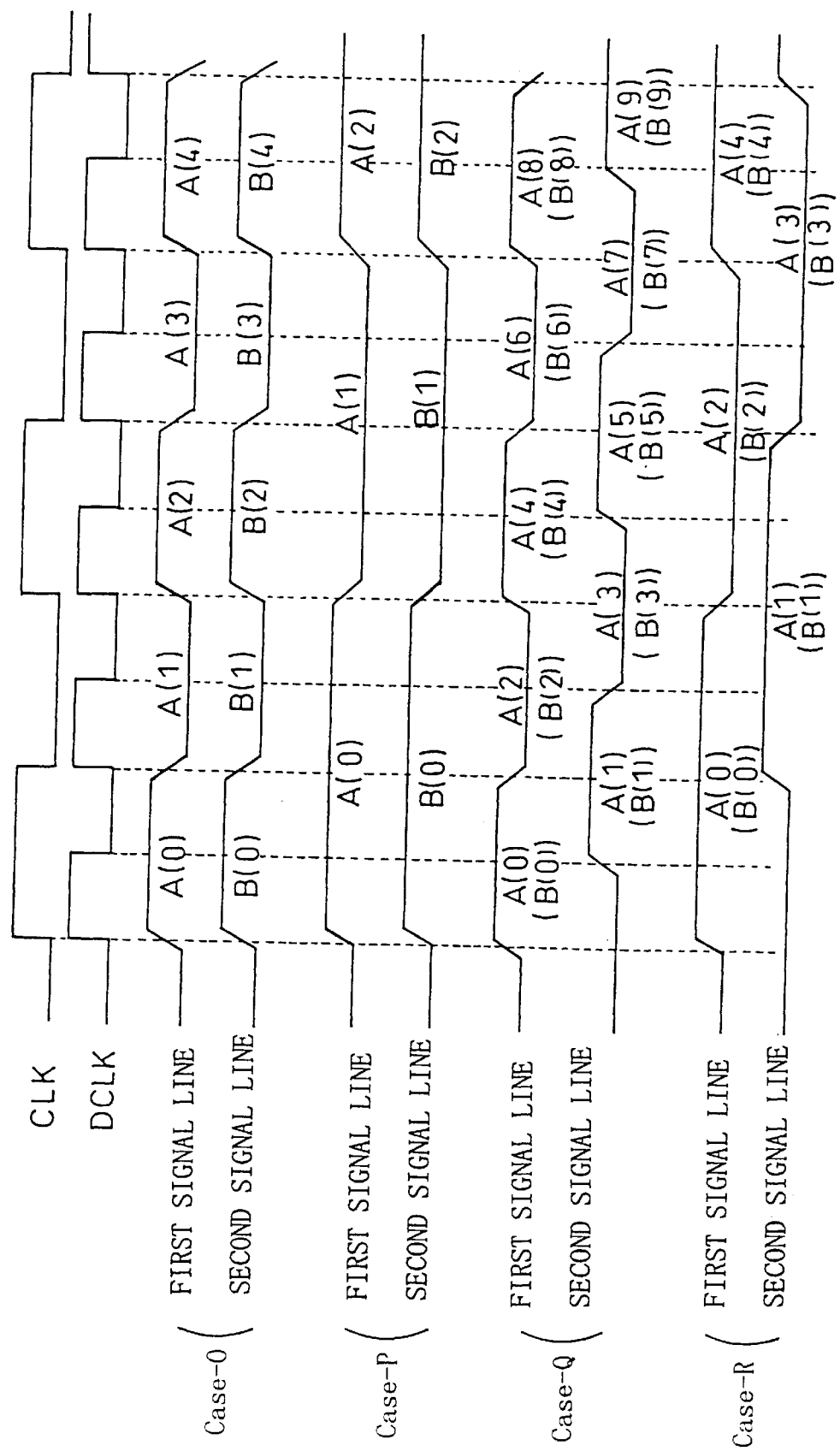
FIG. 29 shows various manners of transmitting signals in the signal transmission circuit of the third embodiment.

FIG. 29 shows various manners of transmitting the first and second signals Ain and Bin, namely a case-O, a case-P, a case-Q and a case-R. The case-O is a case in which both the contents of Ain and the contents of Bin change at approximately the same high transition probability. The case-P is a case in which both the contents of Ain and the contents of Bin change at approximately the same low transition probability. The case-Q is a case in which only either one of the TPs of Ain and Bin is above a determined value and the transmission of the other signal is not required. The case-R is a case in which only either one of the TPs of Ain and Bin is high but below a predetermined value and the transmission of the other signal is not required.

Figure 30:
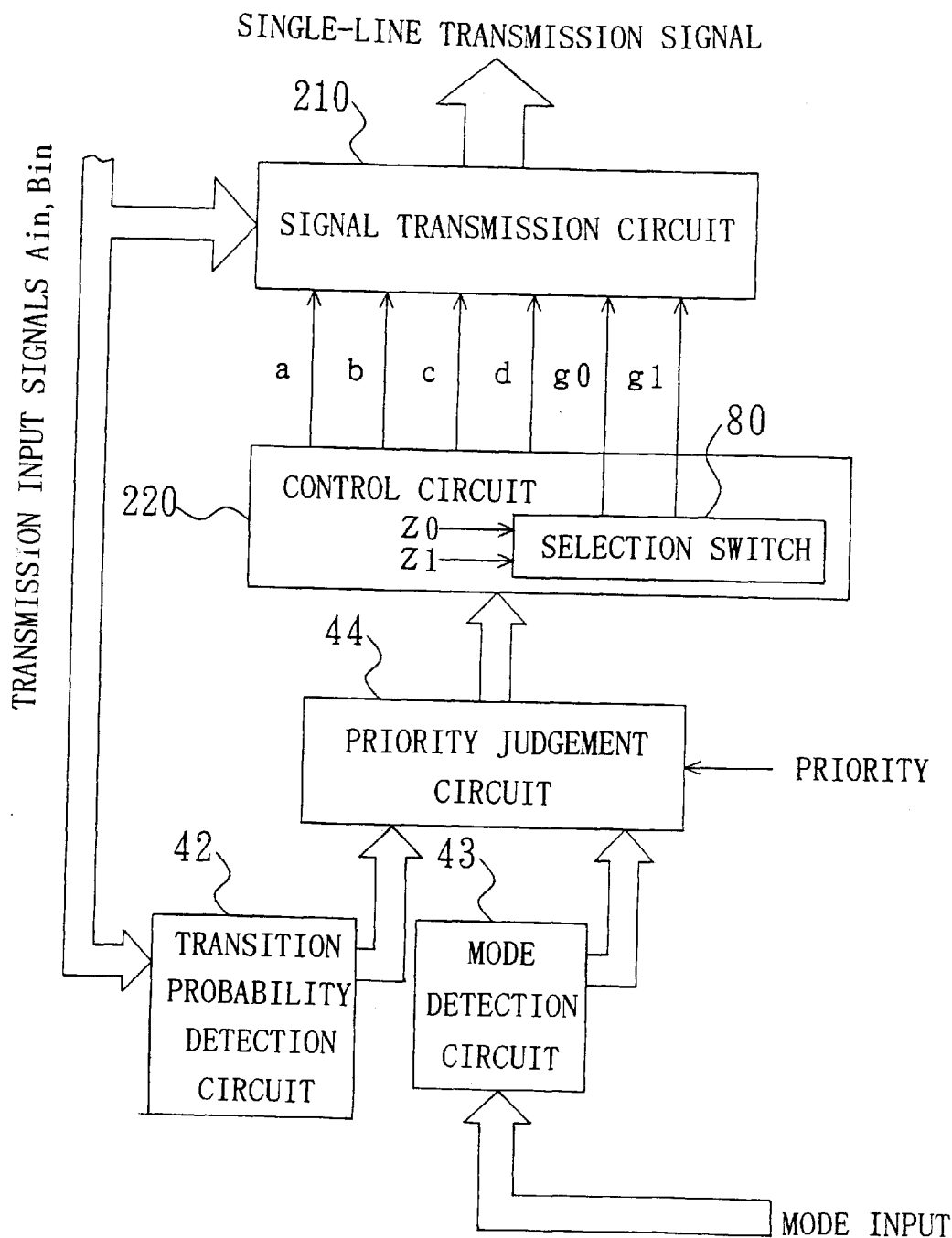
FIG. 30 outlines the entire configuration of the signal transmission circuit of the third embodiment.

A circuit, shown in FIG. 30, controls the four switch circuits SW-1, SW-2, SW-3 and SW-4 and the first and second drivers 70 and 71 of FIG. 27, in each of the above-described cases. 210 is a signal transmission circuit identical with the one shown in FIG. 27. 42, 43 and 44 are a transition probability detection circuit (TPDC), a mode detection circuit and a priority judgement circuit, all of which are identical in configuration with the corresponding ones in the first embodiment. 220 is a control circuit for generating the control signals a–d and the drive signals g0 and g1 to the switch circuits SW-1, SW-2, SW-3 and SW-4 and to the first and second drivers 70 and 71, respectively. The switch circuits SW-1, SW-2, SW-3 and SW-4 and the first and second drivers 70 and 71 are arranged in the signal transmission circuit 210. The control signal 220 generates code signals z0 and z1 for each of the case-O (the TP of Ain is as high as that of Bin), the case-P (the TP of Ain is as low as that of Bin), the case-Q (the TP of one of Ain and Bin is above a predetermined value and the transmission of the other signal is not required) and the case-R (the TP of one of Ain and Bin is below a predetermined value and the transmission of the other signal is not required). The code signals z0 and z1 are set as shown in FIG. 32. For the case of the case-O, z0 and z1 are set at "0" and at "0", respectively. For the case of the case-P, z0 and z1 are set at "0" and at "1", respectively. For the case of the case-Q, z0 and z1 are set at "1" and at "0", respectively. For the case of the case-R, z0 and z1 are set at "1" and at "1", respectively.

Figure 31:
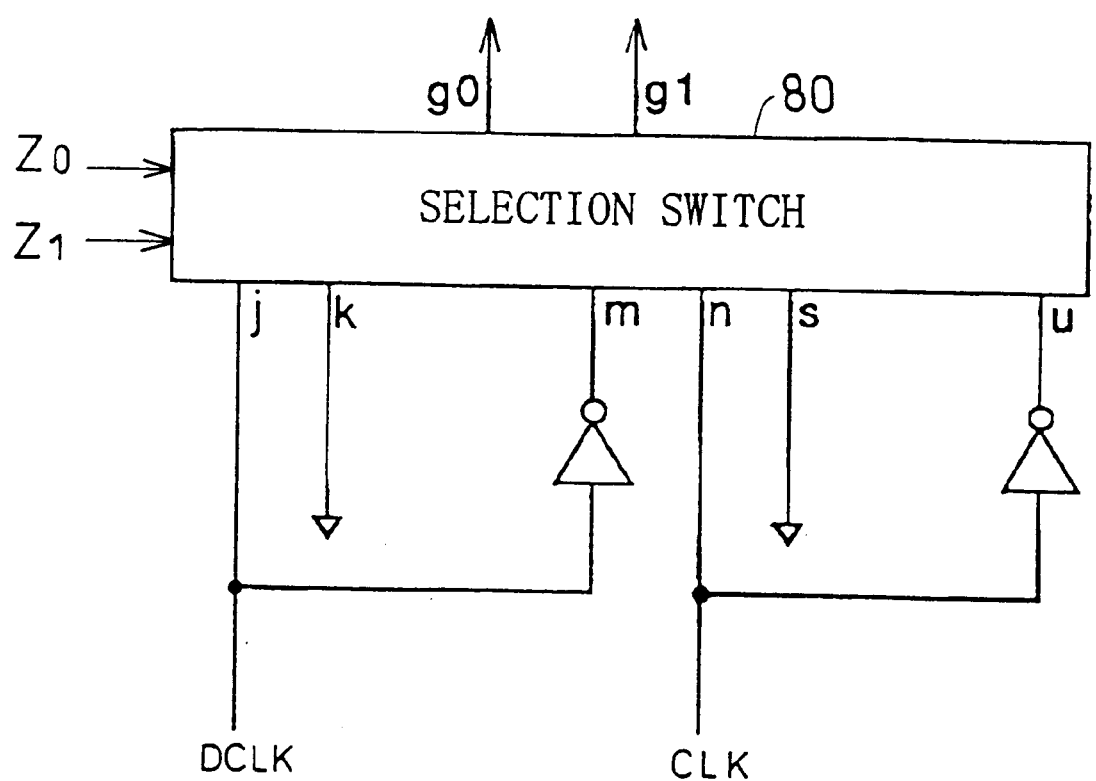
FIG. 31 depicts the configuration of a control circuit of the signal transmission circuit of the third embodiment.

The control circuit 220 contains therein a selection switch 80. The selection switch 80 receives the code signals z0 and z1 from the control circuit 220. FIG. 31 shows the configuration of the selection switch 80. The selection switch 80 receives CLK, /CLK and ground potential as a signal n, as a signal u and as a signal s, respectively. In addition to these signals, the selection switch 80 further receives DCLK, /DCLK and ground potential as a signal j, as a signal m and as a signal k, respectively. According to the input code signal z0 and z1, the selection switch 80 selects any two of the signals n, u, s, j, m and k and provides the two signals thus selected to the first and second drivers 70 and 71 of FIG. 27 as the drive signals g0 and g1. More specifically, in the case-O (z0="0", z1="0"), it is set such that g0=j and g1=j (see a truth table of FIG. 32) and both the first signal A and the second signal B are transmitted according to the clock signal DCLK. In the case-P (z0="0", z1="1"), it is set such that g0=n and g1=n and both the first signal A and the second signal B are transmitted according to the clock signal CLK. In the case-Q (z0="1", z1="0"), it is set such that g0=j and g1=m and the first signal A (or the second signal B) is transmitted according to the clock signal DCLK and its inverted signal, /DCLK. In the case-R (z0="1", z1="1"), it is set such that g0=n and g1=u and the first signal A (or the second signal B) is transmitted according to the clock signal CLK and its inverted signal, /CLK.

The control circuit 220 decodes the code signals z0 and z1, to generate the control signals a–d for the switch circuits SW-1, SW-2, SW-3 and SW-4. More specifically, either in the case-O or in the case-P of the FIG. 32 truth table, the first and second switch circuits SW-1 and SW-2 are closed and the first and second signals A and B are transmitted from the signal line 1 and from the signal line 2, respectively. Either in the case-Q or in the case-R, at the time of transmitting, for example, the first signal A, the first and third switch circuits SW-1 and SW-3 are closed and two first signals A and A in series are transmitted sequentially from the first and second signal lines 1 and 2.

In the case-Q and the case-R, a signal that is transmitted to the second signal line 2 is delayed by a quarter cycle with respect to a signal that is transmitted to the first signal line 1. If such a delay becomes a problem, then the following technique may be taken.

Figure 33:
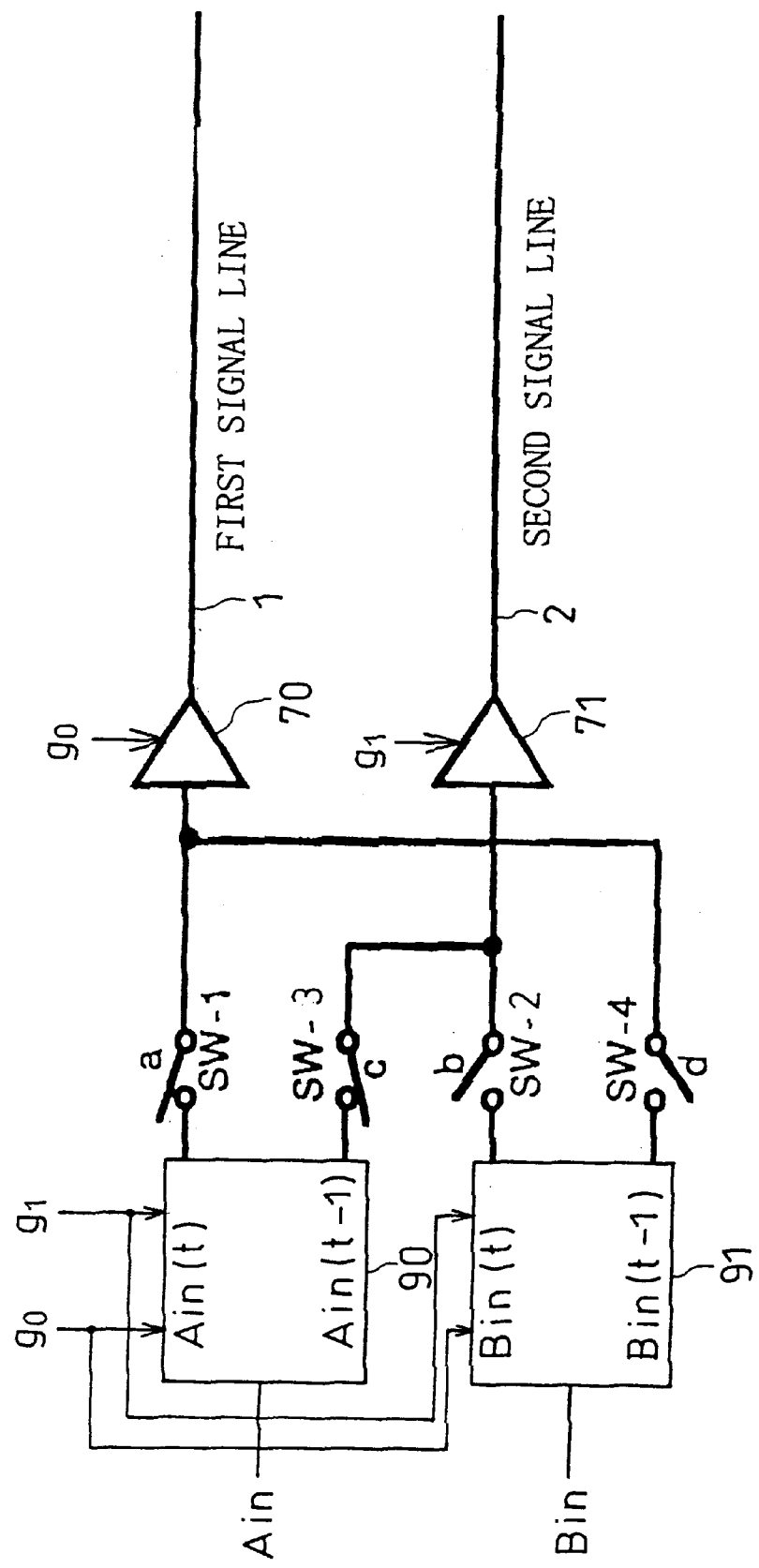
FIG. 33 shows a circuit as a result of partially modifying the signal transmission circuit of the third embodiment.

Referring to FIG. 33, there is provided a first latch circuit 90 with two output ports capable of sequentially latching two consecutive first signals Ai and Ai in time and the two output ports of the latch circuit 90 are connected to the switch circuit SW-1 and to the switch circuit SW-3, respectively. Likewise, there is provided a second latch circuit 91 with two output ports and the two output ports are connected to the switch circuit SW-2 and to the switch circuit SW-4, respectively. As a result of such a configuration, two first signals Ain(n) and Ain(n+1) in series can simultaneously be transmitted from the latch circuit 90 to the first signal line 1 and to the second signal line 2, respectively, and two second signals Bin(n) and Bin(n+1) in series can simultaneously be transmitted from the latch circuit 91 to the first signal line 1 and to the second signal line 2, respectively.

The invention claimed is:

1. A signal transmission circuit comprising a unit circuit, said unit circuit including:
    (a) a first and second signal lines through which a first and second signals are conveyed;
    (b) a signal generation circuit for generating a mismatch signal which forms a differential signal pair with at least one of said first and second signals and which does not match in time with said one of said first and second signals; and
    (c) control means which receives said mismatch signal and said at least one of said first and second signals and which transmits said received signals to said first and second signal lines as said differential signal pair.

2. A signal transmission circuit comprising a plurality of said unit circuits set forth in claim 1.

3. A signal transmission circuit according to claim 1 or claim 2,
    said signal generation circuit including:
    (a) a first signal generation circuit for generating a first mismatch signal which forms a first differential signal pair with said first signal and which does not match in time with said first signal; and
    (b) a second signal generation circuit for generating a second mismatch signal which forms a second differential signal pair with said second signal and which does not match in time with said second signal;
    said control means including:
    (c) selection means for receiving said first and second signals and said first and second mismatch signals and for selecting between said first differential signal pair and said second differential signal pair for forwarding to said first and second signal lines; and
    (d) designation means for determining which of said first and second differential signal pairs is selected by said selection means.

4. A signal transmission circuit according to claim 3 wherein said designation means designates, based on a transition probability of said first and second signals with respect to time, one of said first and second differential signal pairs that is selected by said selection means.

5. A signal transmission circuit according to claim 4 wherein said designation means designates one of said first and second differential signal pairs that includes the higher of said first and second signals in the transition probability with respect to time.

6. A signal transmission circuit according to claim 4,
    said designation means having a transition probability detection circuit for detecting transition probabilities with respect time for said first and second signals;
    said transition probability detection circuit having a first exclusive OR circuit of a plurality of bits and a second exclusive OR circuit of a plurality of bits;
    said first exclusive OR circuit having a first and second input terminals, said first and second input terminals alternately receiving said first signal; and
    said second exclusive OR circuit having a first and second input terminals, said first and second input terminals alternately receiving said second signal.

7. A signal transmission circuit according to claim 6,
    said designation means having a judgement circuit which selects the higher of said first and second signals in transition probability; and
    said judgement circuit having a comparison circuit which makes a comparison between a bit of the output of said first exclusive OR circuit and a corresponding bit of the output of said second exclusive OR circuit.

8. A signal transmission circuit according to claim 3 wherein said designation means selects one of a plurality of pre-set signal output patterns and designates, based on said selected signal output pattern, one of said first and second differential signal pairs that is selected by said selection means.

9. A signal transmission circuit according to claim 8 wherein said designation means has a signal output pattern so that, when the transition probability of said first signal is as high as the transition probability of said second signal, one said first differential signal pair and one said second differential signal pair are differential-transmitted once within one cycle of a clock signal.

10. A signal transmission circuit according to claim 8 wherein said designation means has a signal output pattern so that, when the transition probability of said first signal is as low as the transition probability of said second signal, said first and second differential signal pairs are differential-transmitted by turns for every cycle of a clock signal.

11. A signal transmission circuit according to claim 8 wherein said designation means has a signal output pattern so that, when the transition probability of one of said first and second signals is higher than the transition probability of the other signal and is below a predetermined value, only one of said first and second differential signal pairs that includes said one of said first and second signals is differential-transmitted once for every cycle of the clock signal.

12. A signal transmission circuit according to claim 8 wherein said designation means has a signal output pattern so that, when the transition probability of one of said first and second signals is higher than the transition probability of the other signal by more than said predetermined value, only one of said first and second differential signal pairs that includes said one of said first and second signals is differential-transmitted twice within one cycle of the clock signal.

13. A signal transmission circuit according to claim 3 wherein said designation means designates, based on mode information including system usage-condition information, one of said first and second differential signal pairs that is selected by said selection means.

14. A signal transmission circuit according to claim 3, said designation means including:
    (a) a transition probability detection circuit for detecting transition probabilities with respect to time for said first and second signals;
    (b) a mode information detection circuit for detecting mode information including system usage-condition information; and
    (c) a priority judgement circuit for selecting between an output of said transition probability detection circuit and an output of said mode information detection circuit in accordance with a predetermined priority of selection;

wherein one of said first and second differential signal pairs that is selected by said selection means is designated based on said detected transition probabilities or based on said detected mode information.

15. A signal transmission circuit according to claim 1 or claim 2, said signal transmission circuit further comprising:
(a) receiving-area selection means for selecting either said first signal or said second signal of said differential signal pairs which are transmitted to said first and second signal lines by said selection means and which contain either said first signal or said second signal;
(b) first memory means for sequentially storing said first signal selected by said receiving-area selection means; and
(c) second memory means for sequentially storing said second signal selected by said receiving-area selection means.

16. A signal transmission circuit according to claim 1 or claim 2 wherein said first signal and said second signal are two different signals that greatly differ from each other in transition probability distribution characteristic with respect to time.

17. A signal transmission circuit according to claim 16 wherein both said first signal and said second signal are image data and wherein one of said first and second signals is luminance signal information and another of said first and second signals which is not luminance signal information is chrominance signal information.

18. A signal transmission circuit according to claim 16 wherein both said first signal and said second signal are image data and wherein one of said first and second signals is window information dedicated to characters and another of said first and second signals which is not window information dedicated to characters is window information for display of images.

19. A signal transmission circuit according to claim 16 wherein both said first signal and said second signal are image data and wherein one of said first and second signals is even-numbered field information and another of said first and second signals which is not even-numbered field information is odd-numbered field information.

20. A signal transmission circuit according to claim 3, said designation means including:
frequency designation means for designating the number of times said selection means selects a differential signal pair within one cycle of a clock signal that is a synchronous signal.

21. A signal transmission circuit according to claim 3 wherein each of said first and second signal generation means is formed by an inverter which generates as a mismatch signal a signal complementary to the signal to be conveyed.

22. A signal transmission circuit according to claim 3 wherein each of said first and second signal generation means is formed by a first and second delay signal generation circuits, each of said first and second delay signal generation circuits generating as the mismatch signal a signal with a time delay with respect to a signal to be conveyed.

23. A signal transmission circuit according to claim 22 wherein each of said first and second delay signal generation means is formed by delay elements which are connected in series with said first and second signal lines, respectively.

24. A signal transmission circuit according to claim 3 wherein each of said first and second signal generation means is formed by a first and second current-amount change circuits each of which generates as the mismatch signal a signal resulting from changing the current amount of a signal to be conveyed.

25. A signal transmission circuit according to claim 24 wherein each of said first and second current-amount change circuits is formed of an impedance change circuit which changes the impedance of said first and second signal lines.

26. A signal transmission method of transmitting a first and second signals to be conveyed by means of a first and second signal lines, said signal transmission method comprising:
(a) a first step of receiving said first and second signals;
(b) a second step of generating a mismatch signal which forms a differential signal pair with at least one of said first and second signals and which does not match in time with said one of said first and second signals; and
(c) a third step of transmitting said mismatch signal and said at least one of said first and second signals to said first and second signal lines as said differential signal pair.

27. A signal transmission method according to claim 26 wherein said second step includes generating the mismatch signal to one of said first and second signals which is at a higher voltage than the other in transition probability with respect to time.

28. A signal transmission method according to claim 27 wherein, at the time of selecting a differential signal pair including a signal with a high transition probability, a plurality of said differential signal pairs are continuously in time transmitted to said first and second signal lines within one cycle of a clock signal that is a synchronous signal.

29. A signal transmission method according to claim 26,
said second step including generating a first and second mismatch signals that do not match in time with said first and second signals, respectively; and
said third step including:
(a) detecting transition probabilities with time for said first and second signals;
(b) selecting between a first differential signal pair made up of said first signal and said first mismatch signal and a second differential signal pair made up of said second signal and said second mismatch signal, according to said detected transition probabilities; and
(c) sending said selected differential signal pair to said first and second signal lines.

30. A signal transmission method according to claim 26,
said second step including generating first and second mismatch signals that do not match in time with said first and second signals, respectively, wherein said first signal and said first mismatch signal comprise a first differential signal pair, and said second signal and said second mismatch signal comprise a second differential signal pair; and
said third step including:
(a) detecting mode information including system usage-condition information;
(b) selecting between said first differential signal pair and said second differential signal pair, according to said detected mode information; and
(c) sending said selected differential signal pair to said first and second signal lines.

31. A signal transmission circuit for transmitting first and second signals to be conveyed by means of first and second signal lines, said signal transmission circuit comprising a unit circuit;

said unit circuit comprising:
- (a) first switch means for inputting said first signals and for outputting said first signals to said first signal line;
- (b) second switch means for inputting said second signals and for outputting said second signal to said second signal line;
- (c) third switch means for inputting said first signals and for outputting said first signals to said second signal line;
- (d) fourth switch means for inputting said second signals and for outputting said second signals to said first signal line;
- (e) first control means for controlling, at a time when said second switch means sends no second signals to said second signal line and said first switch means sends one of said first signals to said first signal line, said third switch means to send a next first signal to said second signal line; and
- (f) second control means for controlling, at a time when said first switch means sends no first signals to said first signal line and said second switch means sends one of said second signals to said second signal line, said fourth switch means to send a next second signal to said first signal line.

32. A signal transmission circuit comprising a plurality of said unit circuits set forth in claim 31.

33. A signal transmission circuit according to claim 31 or claim 32, said signal transmission circuit further comprising a first and second latch circuits for continuously latching a plurality of said first signals and a plurality of said second signals;

wherein an output from said first latch circuit is applied to said first and third switch means while an output from said second latch circuit is applied to said second and fourth switch means.

34. A signal transmission circuit according to claim 31 or claim 32, each of said first and second control means having transition probability detection means for detecting a transition probability of said first and second signals with respect to time;

each of said first and second control means detecting, based on the detected transition probability, the fact that neither of said first and second signals are sent to said first and second signal lines.

35. A signal transmission circuit according to claim 31 or claim 32, each of said first and second control means having mode detection means for detecting mode information including system usage-condition information;

each of said first and second control means detecting, based on said detected mode information, the fact that neither of said first and second signals are sent to said first and second signal lines.

36. A signal transmission circuit according to claim 31 or claim 32, said signal transmission circuit further comprising:
- (a) transition probability detection means for detecting a transition probability of said first and second signals with respect to time;
- (b) mode detection means for detecting mode information including system usage-condition information; and
- (c) selection means for selecting between the output from said transition probability detection means and the output from said mode detection means according to predetermined priority;

each of said first and second control means detecting, based on said transition probability or said mode information selected by said selection means, the fact that neither of said first and second signals are sent to said first and second signal lines.

37. A signal transmission circuit according to claim 31 or claim 32 wherein said first signals and said second signals are two different signals that greatly differ from each other in transition probability with respect to time.

38. A signal transmission circuit according to claim 37 wherein both said first signal and said second signal are image data and wherein one of said first and second signals is luminance signal information and another of said first and second signals which is not luminance signal information is chrominance signal information.

39. A signal transmission circuit according to claim 37 wherein both said first signal and said second signal are image data and wherein one of said first and second signals is window information dedicated to characters and another of said first and second signals which is not window information dedicated to characters is window information for display of images.

40. A signal transmission method of transmitting first and second signals to be conveyed by means of first and second signal lines, said signal transmission method comprising the steps of:
- (a) receiving said first and second signals;
- (b) sending one of said first signals to said first signal line;
- (c) detecting a transition probability of said received second signals with respect to time; and
- (d) when said transition probability is low, sending a next first signal to said second signal line.

41. A signal transmission method of transmitting first and second signals to be conveyed by means of first and second signal lines, said signal transmission method comprising the steps of:
- (a) receiving said first and second signals;
- (b) sending one of said first signals to said first signal line;
- (c) detecting mode information including system usage-condition information; and
- (d) when said detected mode information indicates that it is unnecessary to transmit any of said received second signals, sending a next first signal to said second signal line.

* * * * *

UNITED STATES PATENT AND TRADEMARK OFFICE
CERTIFICATE OF CORRECTION

PATENT NO. : 5,898,735
DATED : April 27, 1999
INVENTOR(S) : Yamauchi

It is certified that error appears in the above-identified patent and that said Letters Patent is hereby corrected as shown below:

In the claims:

Claim 21, line 54, delete "a" and insert --the--; and line 55, delete "the" and insert --a--.

Signed and Sealed this

Eleventh Day of January, 2000

Attest:

Q. TODD DICKINSON

*Attesting Officer*     *Acting Commissioner of Patents and Trademarks*